(12) United States Patent
Noh et al.

(10) Patent No.: US 11,206,177 B2
(45) Date of Patent: Dec. 21, 2021

(54) SCHEME FOR CONFIGURING REFERENCE SIGNAL AND COMMUNICATING CHANNEL STATE INFORMATION IN A WIRELESS COMMUNICATION SYSTEM USING MULTIPLE ANTENNA PORTS

(71) Applicant: Samsung Electronics Co., Ltd., Suwon-si (KR)

(72) Inventors: Hoon-Dong Noh, Suwon-si (KR); Young-Woo Kwak, Suwon-si (KR); Cheol-Kyu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/388,587

(22) Filed: Dec. 22, 2016

(65) Prior Publication Data
US 2017/0180194 A1  Jun. 22, 2017

Related U.S. Application Data

(60) Provisional application No. 62/352,748, filed on Jun. 21, 2016, provisional application No. 62/271,065, filed on Dec. 22, 2015.

(51) Int. Cl.
*H04L 12/24* (2006.01)
*H04L 5/00* (2006.01)
(Continued)

(52) U.S. Cl.
CPC ........... *H04L 41/08* (2013.01); *H04B 7/0617* (2013.01); *H04B 7/0626* (2013.01); *H04L 5/005* (2013.01);
(Continued)

(58) Field of Classification Search
None
See application file for complete search history.

(56) References Cited

U.S. PATENT DOCUMENTS 9,119,082 B1 * 8/2015 Gomadam ............... H04B 1/28
9,480,063 B2   10/2016 Bhattad et al.
(Continued)

FOREIGN PATENT DOCUMENTS

CN  101932096 A  12/2010
CN  102195741 A   9/2011
(Continued)

OTHER PUBLICATIONS

Chinese Office Action with English translation dated Jun. 23, 2020; Chinese Appln. No. 201680076011.5.
(Continued)

*Primary Examiner* — Christopher T Wyllie
(74) *Attorney, Agent, or Firm* — Jefferson IP Law, LLP

(57) ABSTRACT

A method for transmitting a channel state information reference signal (CSI-RS) by using multiple antenna ports and receiving CSI in a wireless communication system is provided. The method includes transmitting at least one CSI-RS configuration information for configuring a resource for transmission of the CSI-RS, transmitting the CSI-RS in a resource determined based on the CSI-RS configuration information, and receiving CSI corresponding to the transmitted CSI-RS, in which the CSI-RS configuration information includes information indicating a frequency comb type in which the CSI-RS is transmitted.

16 Claims, 12 Drawing Sheets

(51) Int. Cl.
*H04B 7/06* (2006.01)
*H04B 7/0413* (2017.01)

(52) U.S. Cl.
CPC .......... *H04L 5/0023* (2013.01); *H04L 5/0048* (2013.01); *H04B 7/0413* (2013.01)

(56) References Cited

U.S. PATENT DOCUMENTS

| | | | | |
|---|---|---|---|---|
| 9,831,994 | B2* | 11/2017 | Gaal | H04L 5/0048 |
| 2010/0105061 | A1 | 4/2010 | Jacob et al. | |
| 2011/0176581 | A1* | 7/2011 | Thomas | H04B 1/7097 |
| | | | | 375/146 |
| 2011/0194551 | A1* | 8/2011 | Lee | H04B 7/0626 |
| | | | | 370/342 |
| 2012/0039298 | A1* | 2/2012 | Lee | H04L 1/0079 |
| | | | | 370/330 |
| 2012/0120903 | A1 | 5/2012 | Kim et al. | |
| 2012/0190356 | A1* | 7/2012 | Zhao | H04L 25/0204 |
| | | | | 455/422.1 |
| 2012/0257515 | A1* | 10/2012 | Hugl | H04W 24/10 |
| | | | | 370/252 |
| 2012/0281556 | A1* | 11/2012 | Sayana | H04B 7/024 |
| | | | | 370/252 |
| 2013/0003788 | A1* | 1/2013 | Marinier | H04B 7/024 |
| | | | | 375/219 |
| 2013/0114535 | A1* | 5/2013 | Ng | H04L 5/0005 |
| | | | | 370/329 |
| 2014/0126496 | A1* | 5/2014 | Sayana | H04B 7/024 |
| | | | | 370/329 |
| 2014/0153526 | A1* | 6/2014 | Mazzarese | H04B 7/024 |
| | | | | 370/329 |
| 2014/0198675 | A1* | 7/2014 | He | H04L 5/0048 |
| | | | | 370/252 |
| 2014/0200012 | A1* | 7/2014 | Ito | H04L 1/0026 |
| | | | | 455/450 |
| 2015/0092768 | A1* | 4/2015 | Ng | H04W 48/16 |
| | | | | 370/350 |
| 2015/0180684 | A1* | 6/2015 | Chen | H04B 17/24 |
| | | | | 370/252 |
| 2016/0028519 | A1* | 1/2016 | Wei | H04B 7/0456 |
| | | | | 375/267 |
| 2016/0112167 | A1* | 4/2016 | Xu | H04L 5/005 |
| | | | | 370/329 |
| 2016/0142189 | A1* | 5/2016 | Shin | H04L 5/0048 |
| | | | | 370/329 |
| 2016/0174093 | A1* | 6/2016 | Zhou | H04W 24/10 |
| | | | | 370/252 |
| 2016/0226538 | A1 | 8/2016 | Kim et al. | |
| 2016/0226640 | A1 | 8/2016 | Seol et al. | |
| 2016/0337178 | A1* | 11/2016 | Frenne | H04L 41/0803 |
| 2017/0180194 | A1* | 6/2017 | Noh | H04L 41/08 |
| 2017/0264412 | A1* | 9/2017 | Chen | H04L 5/0048 |
| 2017/0265092 | A1* | 9/2017 | Liu | H04J 13/10 |
| 2018/0054290 | A1* | 2/2018 | Park | H04L 5/0057 |
| 2018/0076940 | A1* | 3/2018 | Zhou | H04L 5/0048 |
| 2018/0102817 | A1* | 4/2018 | Park | H04B 7/0417 |
| 2018/0167122 | A1* | 6/2018 | Gao | H04B 7/0626 |
| 2018/0205577 | A1* | 7/2018 | Shin | H04L 5/0023 |
| 2018/0234278 | A1* | 8/2018 | Xu | H04L 5/005 |

FOREIGN PATENT DOCUMENTS

| | | |
|---|---|---|
| CN | 102884751 A | 1/2013 |
| CN | 103283196 A | 9/2013 |
| EP | 3 197 087 A1 | 7/2017 |
| KR | 10-2009-0008037 A | 1/2009 |
| KR | 10-2015-0113664 A | 10/2015 |
| WO | 2015-060645 A1 | 4/2015 |
| WO | 2015-064976 A2 | 5/2015 |

OTHER PUBLICATIONS

European Search Report dated Nov. 30, 2018; European Appln. No. 16879361.0-1219 / 3391555.
European Search Report dated Dec. 22, 2020; European Appln. No. 16 879 361 .0-1205.
Chinese Office Action with English translation dated Feb. 23, 2021; Chinese Appln. No. 201680076011.5.

* cited by examiner

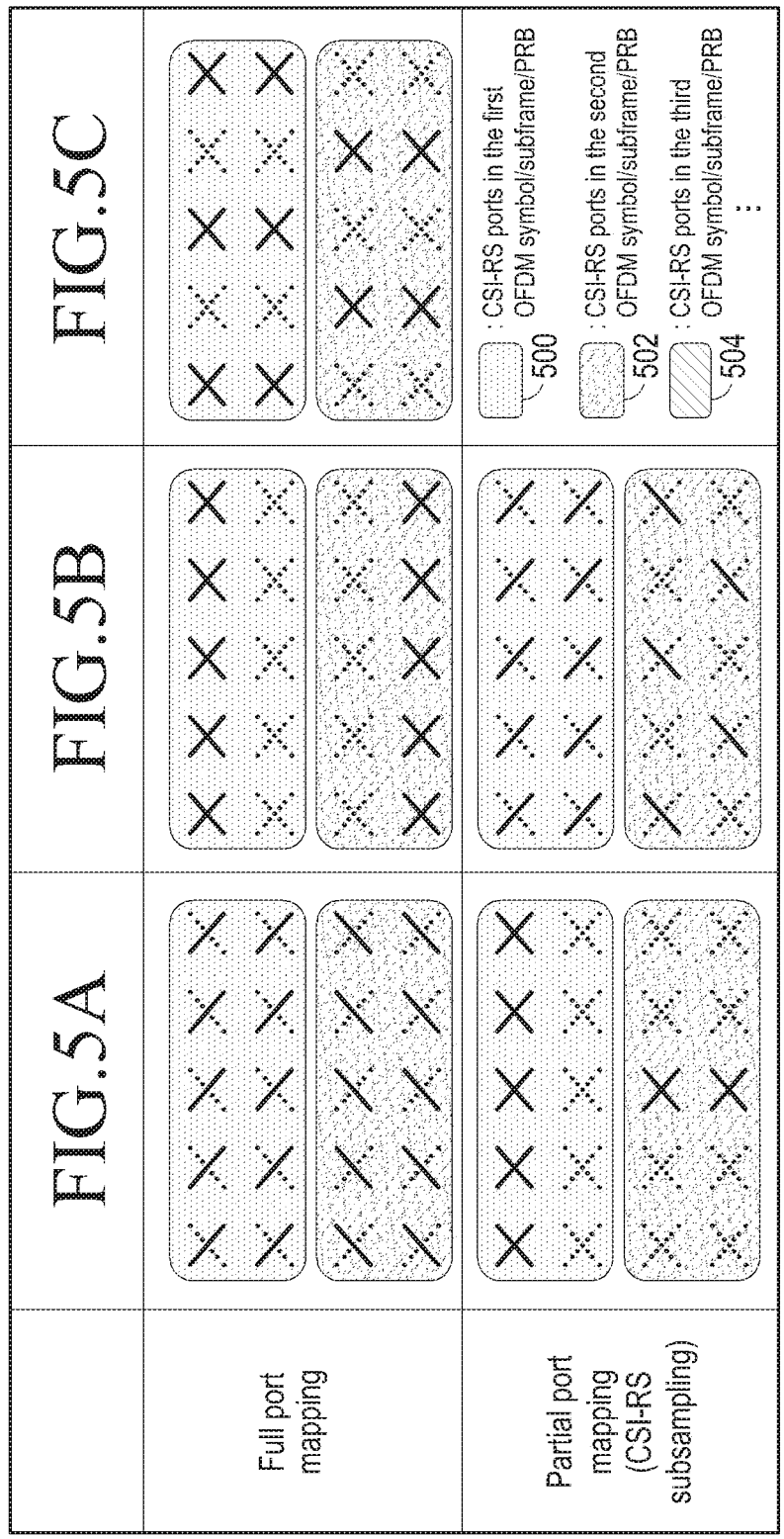

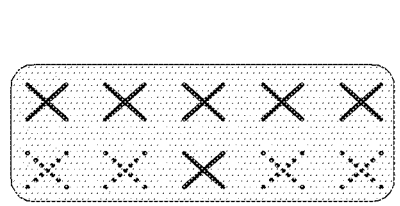
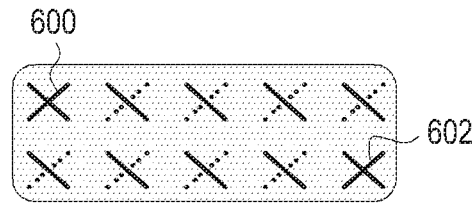
FIG.6A         FIG.6B
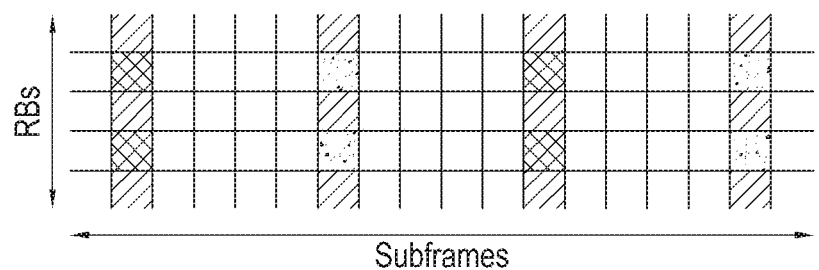
700 ~ ▨ : PRB with CSI-RS group A ($comb_T = X$, $comb_F = 0$)
702 ~ ▩ : PRB with CSI-RS group B ($comb_T = 0$, $comb_F = 1$)
704 ~ ▦ : PRB with CSI-RS group C ($comb_T = 1$, $comb_F = 1$)
FIG.7

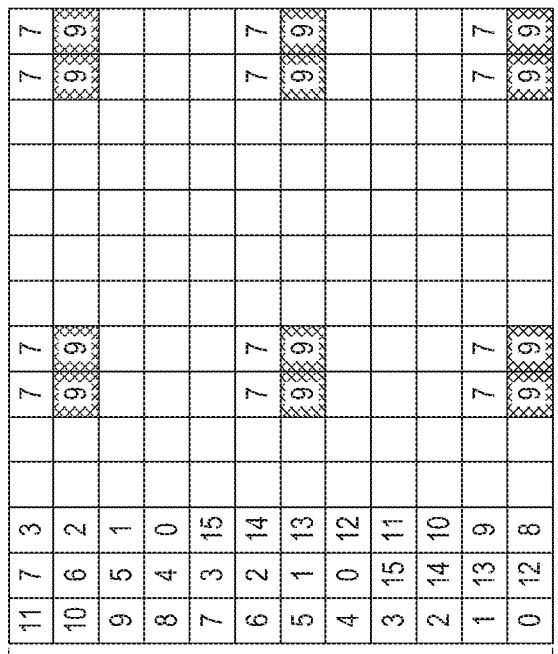
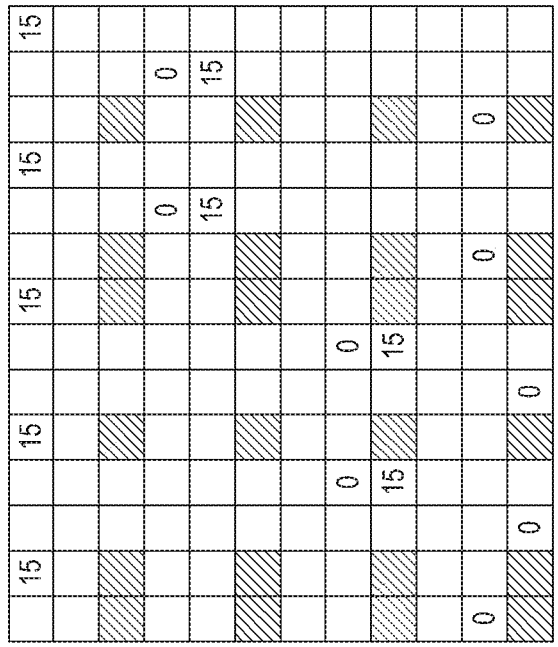
FIG.8A
FIG.8B

SCHEME FOR CONFIGURING REFERENCE SIGNAL AND COMMUNICATING CHANNEL STATE INFORMATION IN A WIRELESS COMMUNICATION SYSTEM USING MULTIPLE ANTENNA PORTS

CROSS-REFERENCE TO RELATED APPLICATION(S)

This application claims the benefit under 35 U.S.C. § 119(e) of a U.S. provisional patent application filed on Dec. 22, 2015 in the U.S. Patent and Trademark Office and assigned Ser. No. 62/271,065, and a U.S. provisional patent application filed on Jun. 21, 2016 the U.S. Patent and Trademark Office and assigned Ser. No. 62/352,748, the entire disclosure of each of which is hereby incorporated by reference.

TECHNICAL FIELD

The present disclosure relates to a wireless communication system. More particularly, the present disclosure relates to a method for measuring wireless channel qualities of signals transmitted from multiple base stations using multiple active array antennas and transmitting and receiving channel state information for notifying measurement results in a wireless communication system using a multiple access scheme.

BACKGROUND

Wireless communication systems have evolved into high-speed and high-quality wireless packet data communication systems to provide a high-volume data service and a multimedia service beyond an initial voice-oriented service. Various standardization organizations, such as the $3^{rd}$-generation partnership project (3GPP), the Institute of Electrical and Electronics Engineers (IEEE), and the like, have developed $4^{th}$-generation (4G) evolution mobile communication system standards using a multi-carrier-based multiple access scheme to satisfy various demands. As a result, various mobile communication standards, such as the long term evolution advanced (LTE-A) of the 3GPP, 802.16m of the IEEE, and the like, have been developed to support a high-speed and high-quality wireless packet data transmission service based on a multiple access scheme using multi-carriers.

As mentioned previously, the existing 4G evolution mobile communication systems, such as the LTE-A, 802.16m, and the like, are based on a multi-carrier multiple access scheme, and use various techniques, such as multiple input multiple output (MIMO, multiple antennas), beamforming, adaptive modulation and coding (AMC), channel sensitive scheduling, and the like, so as to improve transmission efficiency. The aforementioned techniques increase system capacity performance through transmission efficiency improvement achieved by collecting transmission power from various antennas using various types of channel state information (CSI), adjusting the amount of transmission data, selectively transmitting data to a user having good channel quality, and the like.

Because of mostly operating based on CSI between an evolved nodeB (eNB) and a user equipment (UE), these schemes need to measure a channel state between the eNB and the UE and for this end, a channel status indication reference signal (CSI-RS) is used. The eNB means a downlink (DL) transmission and uplink (UL) reception apparatus located in a certain place, and one eNB performs transmission and reception with respect to a plurality of cells. In one wireless communication system, a plurality of eNBs are geometrically distributed, and each eNB performs transmission and reception with respect to a plurality of cells.

The existing 3G and 4G mobile communication systems, such as long term evolution (LTE)/LTE-A use the MIMO technique that performs transmission using a plurality of transmission and reception antennas to expand a data transmission rate and a system capacity. The MIMO technique performs transmission by spatially dividing a plurality of information streams using a plurality of transmission and reception antennas. As such, transmission based on spatial division of the plurality of information streams is referred to as spatial multiplexing. Generally, the number of information streams which may be transmitted through spatial multiplexing is defined as a rank of transmission, and the rank varies with the number of antennas of each of a transmitter and a receiver.

For the MIMO technique supported by standards up to LTE/LTE-A Release 12, spatial multiplexing is supported for 2 transmission/reception antennas, 4 transmission/reception antennas, and 8 transmission/reception antennas and a maximum of 8 ranks are supported. On the other hand, a massive MIMO or full-dimension (FD) MIMO system to which a technique proposed in an embodiment of the present disclosure is applied includes 8 or more multiple antennas arranged two-dimensionally.

FIG. 1 illustrates a massive multiple antenna system according to the related art.

Referring to FIG. 1, an eNB transmission equipment 101 transmits a wireless signal by using several tens or more transmission antennas. The plurality of ($=N_H*N_V$) transmission antennas are arranged to have a certain distance therebetween like in FIG. 1. The certain distance may correspond to, for example, a multiple of a half of a wavelength of a transmission wireless signal. Generally, when a distance equaling a half of a wavelength of a wireless signal is maintained between transmission antennas, a signal transmitted in each transmission antenna is affected by a wireless channel having a low correlation. As a distance between transmission antennas increases, a correlation between signals transmitted from respective transmission antennas is reduced.

An eNB transmission equipment having massive antennas may have antennas that are arranged two-dimensionally as shown in FIG. 1 to prevent the scale of the equipment from becoming huge. In this case, by using NH antennas arranged along a horizontal axis and $N_V$ antennas arranged along a vertical axis, the eNB 101 transmits a signal and the UE 103 measures a channel H 102 for a corresponding antenna.

In FIG. 1, several transmission antennas arranged in the base station (BS) transmission equipment are used to transmit a signal to one UE or a plurality of UEs. Proper precoding is applied to a plurality of transmission antennas for simultaneous signal transmission to the plurality of UEs. In this case, one UE may receive one or more information streams. Generally, the number of information streams one UE may receive is determined according to the number of reception antennas of the UE and a channel state.

To effectively implement the massive multiple antenna system, the UE has to accurately measure a channel state between transmission and reception antennas and the magnitude of interference by using multiple reference signals and transmit effective channel state information to the eNB by using the measurement results. The eNB having received the channel state information determines, in relation to DL transmission, UEs to which transmission is to be performed, a data transmission speed at which transmission is to be performed, and precoding to be applied. Since the FD-MIMO system has a large number of transmission antennas, an UL overhead occurs in which a lot of control information has to be transmitted to the UL, if a method of the related art for transmitting and receiving channel state information in an LTE/LTE-A system is applied.

In a wireless communication system, time, frequency, and power resources are limited. Thus, if more resources are allocated to a reference signal, resources allocatable to data traffic channel transmission are reduced, resulting in reduction of the absolute amount of transmission data. As more resources are allocated to reference signals, the performance of channel measurement and estimation may be improved, but the absolute amount of transmission data is reduced, degrading the overall system capacity performance.

Thus, there is a need for proper distribution of a resource for a reference signal and a resource for traffic channel transmission to achieve optimal performance in terms of the overall system capacity.

FIG. 2 illustrates one subframe, which is a minimal unit scheduled for a DL, and radio resources of one resource block (RB) in the LTE/LTE-A system according to the related art.

Referring to FIG. 2, the radio resource includes one subframe on a time axis and includes one RB on a frequency axis. The radio resource includes 12 subcarriers on a frequency domain and 14 orthogonal frequency division multiplexing (OFDM) symbols on a time domain, thus having a total of 168 unique frequency and time positions. In the LTE/LTE-A, each unique frequency and time position in FIG. 2 is referred to as a resource element (RE).

In the radio resource shown in FIG. 2, a plurality of different types of signals as described below may be transmitted.

Cell specific RS (CRS) 200: a reference signal which is periodically transmitted for every UE belonging to one cell and is available commonly to a plurality of UEs.

Demodulation reference signal (DMRS) 202: a reference signal which is transmitted for a particular UE and is transmitted when data is transmitted to the UE. The DMRS 202 may include a total of 8 DMRS ports. In LTE/LTE-A, ports 7 through 14 correspond to DMRS ports, each of which maintains orthogonality not to cause interference therebetween by using code division multiplexing (CDM) or FDM.

Physical downlink shared channel (PDSCH) 204: a channel which is used for an eNB to transmit traffic to a UE through a data channel transmitted in a downlink and which is transmitted using an RE in which a reference signal is not transmitted in a data region 210 of FIG. 2.

Channel status information reference signal (CSI-RS) 208: a reference signal transmitted for UEs belonging to one cell and used to measure a channel status. A plurality of CSI-RSs may be transmitted in one cell.

Other control channels (physical hybrid automatic repeat request (HARQ) indicator channel (PHICH), physical control format indicator channel (PCFICH), physical downlink control channel (PDCCH)) 206: channels used to provide control information needed for a UE to receive a PDSCH or to transmit acknowledgement (ACK)/negative ACK (NACK) for operating HARQ with respect to UL data transmission.

In the LTE-A system, muting may be set to receive CSI-RS transmitted by other eNBs other than the above signals without interference from UEs of a cell served by the other eNBs. The muting may be applied in a position at which CSI-RS may be transmitted, and generally, the UE receives a traffic signal by skipping a radio resource. Such muting may be understood as being performed as a result of rate matching. In the LTE-A system, muting is also referred to as 0 (zero)-power CSI-RS. This is because due to the nature of muting, muting is identically applied to the position of the CSI-RS and transmission power is not transmitted.

In FIG. 2, CSI-RS may be transmitted using some of positions A, B, C, D, E, F, G, H, I, and J (that is, a pattern) corresponding to four REs, depending on the number of antenna ports (APs) for transmitting CSI-RS. Muting may also be applied to some of the positions A, B, C, D, E, F, G, H, I, and J (that is, a pattern). More particularly, CSI-RS may be transmitted through 2, 4, and 8 REs according to the number of transmission APs. For 2 APs, CSI-RS is transmitted through a half of a particular pattern in FIG. 2, and for 4 APs, CSI=RS is transmitted through the entire pattern, and for 8 APs, the CSI-RS is transmitted through two patterns. On the other hand, muting is performed in one pattern unit at all times. For example, muting may be applied to a plurality of patterns, but may not be applied to a part of one pattern if not overlapping with the position of CSI-RS. However, in a case where the position of CSI-RS overlaps with the position of muting, muting may be applied to a part of one pattern.

When CSI-RS is transmitted for two APs, a signal of each AP is transmitted through two REs connected on a time axis and a signal of each AP is identified by an orthogonal code. When CSI-RS is transmitted for four APs, by using two more REs in addition to the CSI-RS for the two APs, the signal for the other two APs is transmitted in the same manner. This process is also applied to transmit CSI-RS for 8 antenna ports.

The eNB boosts the transmission power of the CSI-RS to improve the accuracy of channel estimation. When four or eight APs CSI-RS is transmitted, a particular CSI-RS port is transmitted in a CSI-RS RE in a certain position and is not transmitted in another OFDM symbol in the same OFDM symbol.

FIG. 3 illustrates a CSI-RS RE mapping for an $n^{th}$ physical resource block (PRB) and an $(n+1)^{th}$ PRB when an eNB transmits 8 CSI-RSs according to the related art.

Referring to FIG. 3, in the CSI-RS RE mapping for an $n^{th}$ PRB 300 and an $(n+1)^{th}$ PRB 302, when CSI-RS RE positions for a $15^{th}$ or $16^{th}$ AP are identical to a check pattern 310, the transmission power of the $15^{th}$ or $16^{th}$ AP is not used for CSI-RS REs for the other $17^{th}$ through $22^{nd}$ APs of a check pattern 312. Thus, as shown in FIG. 3, the $15^{th}$ or $16^{th}$ AP may use transmission power to be used in $3^{rd}$, $8^{th}$, and $9^{th}$ subcarriers for a $2^{nd}$ subcarrier. Such natural power boosting makes it possible to set the power of a $15^{th}$ CSI-RS port transmitted through the $2^{nd}$ subcarrier up to a maximum of 6 dB from the transmission power of the $15^{th}$ AP used in a data RE 314. Current 2/4/8 port CSI-RS patterns enable 0/2/6 dB natural power boosting, and respective APs may transmit CSI-RS through full power utilization through the natural power boosting.

The UE may be allocated with CSI interference measurement (CSI-IM) (or interference measurement resources (IMR)) together with CSI-RS, and resources of CSI-IM have the same resource structure and position as CSI-RS supporting 4 ports. The CSI-IM is a resource used for the UE receiving data from one or more eNBs to accurately measure interference from an adjacent eNB. For example, to measure the amount of interference when an adjacent eNB transmits data and the amount of interference when the adjacent eNB does not transmit data, the eNB configures CSI-RS and two CSI-IM resources, one CSI-IM enables an adjacent eNB to transmit a signal at all times and the other CSI-IM disables the adjacent eNB from transmitting a signal at all times, thereby effectively measuring the amount of interference from the adjacent eNB.

In the LTE-A system, the eNB notifies the UE of CSI-RS configuration information through higher layer signaling. The CSI-RS configuration information may include an index of the CSI-RS configuration information, the number of ports included in the CSI-RS, a transmission interval of the CSI-RS, a transmission offset, CSI-RS resource configuration information, CSI-RS scrambling identification (ID), quasi co-locate (QCL) information, and the like.

In a cellular system, the eNB has to transmit an RS to the UE to measure a DL channel state. In the LTE-A system of the 3GPP, the UE measures a channel state between the eNB and the UE by using a CRS or a CSI-RS transmitted by the eNB. For the channel state, several elements need to be considered basically, including the amount of interference in the DL. The amount of interference in the DL includes an interference signal and a thermal noise generated by an antenna included in an adjacent eNB, and is important to the UE to determine a channel condition of the DL. For example, if a transmission antenna transmits a signal to one personal UE in one personal eNB, the UE has to determine energy per symbol that may be received in the downlink using a reference signal received in the eNB and the amount of interference that is to be received at the same time in a period for receiving a symbol, and to determine Es/Io. The determined Es/Io is transformed to a data transmission speed or a value corresponding thereto, and is notified to the eNB in the form of a channel quality indicator (CQI), to allow the eNB to determine a data transmission speed at which transmission to the UE in the DL is to be performed.

In the LTE-A system, the UE feeds information about a channel state of the DL back to the BS to allow the use of the channel state information in DL scheduling of the BS. For example, the UE measures the reference signal transmitted to the eNB in the DL, and information extracted in the measurement is fed back to the BS in a form defined in the LTE/LTE-A standard. In the LTE/LTE-A, the following channel state information is fed back by the UE.

Rank indicator (RI): the number of spatial layers the UE may receive in a current channel state.

Precoder matrix indicator (PMI): an indicator of a precoding matrix the UE prefers in the current channel state.

Channel quality indicator (CQI): a maximum data rate at which the UE may receive data in the current channel state.

Herein, the CQI may be replaced with a signal to interference ratio (SINR) available similarly with a maximum data rate, a maximum error code rate and modulation scheme, data efficiency per frequency, and the like.

The RI, the PMI, and the CQI have meanings in relation to one another. For example, a precoding matrix supported in the LTE/LTE-A is defined differently for each rank. Thus, a value of PMI for RI of 1 and a value of PMI for RI of 2 are interpreted differently (even when the PMI values are equal to each other). It is also assumed that when the UE determines CQI, the rank value and the PMI value notified to the eNB are also applied in the eNB. For example, if the UE notifies the BS of RI_X, PMI_Y, and CQI_Z, a data rate corresponding to CQI_Z may be received by the UE when RI is RI_X and PMI is PMI_Y. As such, the UE assumes which transmission scheme is to be applied to the BS in CQI calculation, thereby obtaining optimized performance when transmission is performed using the transmission scheme.

To generate and report the channel information, an eNB having large-scale antennas has to configure a reference signal resource for measuring channels of 8 or more antennas and transmit the configured reference signal resource to the UE. As shown in FIG. 2, an available CSI-RS resource may use a maximum of 48 REs, but up to 8 CSI-RSs per one CSI process may be set. Thus, to support an FD-MIMO system operating based on 8 or more CSI-RS ports, a new CSI-RS configuration method is needed.

As the demand for dynamic precoding in a vertical direction increases, FD-MIMO configured with uniform planar array (UPA) antenna ports have been discussed actively. The number of CSI-RS ports configurable in one CSI process is limited to {(1 or 2), 4, 8, 12, 16}. Thus, to support FD-MIMO systems having various 2D antenna array shapes, a method for configuring CSI-RS including various numbers of ports, such as {18, 20, 22, 24, 26, 28, 30, 32} is needed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for generating channel state information to perform effective data transmission and reception and sharing the generated channel state information in a long term evolution advanced (LTE-A)-based full-dimension multiple input multiple output (FD-MIMO) system.

Another aspect of the present disclosure is to provide a method and an apparatus for notifying a user equipment (UE) of configuration information about multiple channel status indication reference signals (CSI-RSs) by an evolved nodeB (eNB) and generating feedback information based on the configuration information by the UE to perform high-efficiency data transmission and reception in an FD-MIMO system.

Another aspect of the present disclosure is to provide methods for configuring multiple CSI-RS ports in a terminal in an FD-MIMO system having antennas arranged two-dimensionally and reporting a base station (BS) of a channel state through a CSI process based on the configuration.

In accordance with an aspect of the present disclosure, a method for transmitting a CSI-RS by using multiple antenna ports and receiving CSI in a wireless communication system is provided. The method includes transmitting at least one CSI-RS configuration information for configuring a resource for transmission of the CSI-RS, transmitting the CSI-RS in a resource determined based on the CSI-RS configuration information, and receiving CSI corresponding to the transmitted CSI-RS, in which the CSI-RS configuration information includes information indicating a frequency comb type in which the CSI-RS is transmitted.

In accordance with another aspect of the present disclosure, a method for receiving a CSI-RS transmitted by using multiple antenna ports and transmitting CSI in a wireless communication system is provided. The method includes receiving at least one CSI-RS configuration information for configuring a resource for transmission of the CSI-RS, receiving the CSI-RS in a resource determined based on the CSI-RS configuration information, and transmitting CSI corresponding to the transmitted CSI-RS, in which the CSI-RS configuration information includes information indicating a frequency comb type in which the CSI-RS is transmitted.

In accordance with another aspect of the present disclosure, an apparatus for transmitting a CSI-RS by using multiple antenna ports and receiving CSI in a wireless communication system is provided. The apparatus includes a communicator configured to transmit at least one CSI-RS configuration information for configuring a resource for transmission of the CSI-RS, transmit the CSI-RS in a resource determined based on the CSI-RS configuration information, and receive CSI corresponding to the transmitted CSI-RS, and at least one processor configured to determine the resource based on the CSI-RS configuration information, and control the communicator, in which the CSI-RS configuration information includes information indicating a frequency comb type in which the CSI-RS is transmitted.

In accordance with another aspect of the present disclosure, an apparatus for receiving a CSI-RS transmitted by using multiple antenna ports and transmitting CSI in a wireless communication system is provided. The apparatus includes a communicator configured to receive at least one CSI-RS configuration information for configuring a resource for transmission of the CSI-RS, receive the CSI-RS in a resource determined based on the CSI-RS configuration information, and transmit CSI corresponding to the transmitted CSI-RS and at least one processor configured to determine the resource based on the CSI-RS configuration information, and control the communicator, in which the CSI-RS configuration information includes information indicating a frequency comb type in which the CSI-RS is transmitted.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 5A, 5B, and 5C illustrate CSI-RS sub-group generation for full-port mapping and partial-port mapping in an environment where 20 transceiver radio units (TXRUs) exist according to various embodiments of the present disclosure;

FIGS. 6A and 6B illustrate a partial-port mapping according to various embodiments of the present disclosure;

FIG. 7 illustrates CSI-RS configuration based on time comb ($comb_T$) or frequency comb ($comb_F$) according to an embodiment of the present disclosure;

FIGS. 8A and 8B illustrate a channel measurement resource according to a second embodiment of the present disclosure;

Throughout the drawings, like reference numerals will be understood to refer to like parts, components, and structures.

DETAILED DESCRIPTION

Figure 1:
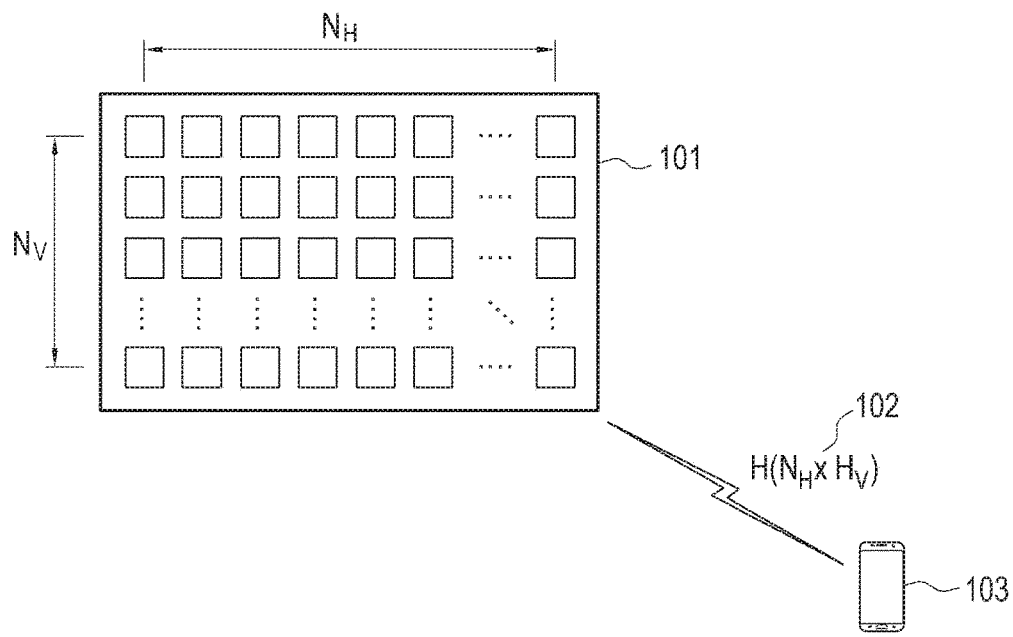
FIG. 1 illustrates a massive multiple antenna system according to the related art.
Figure 2:
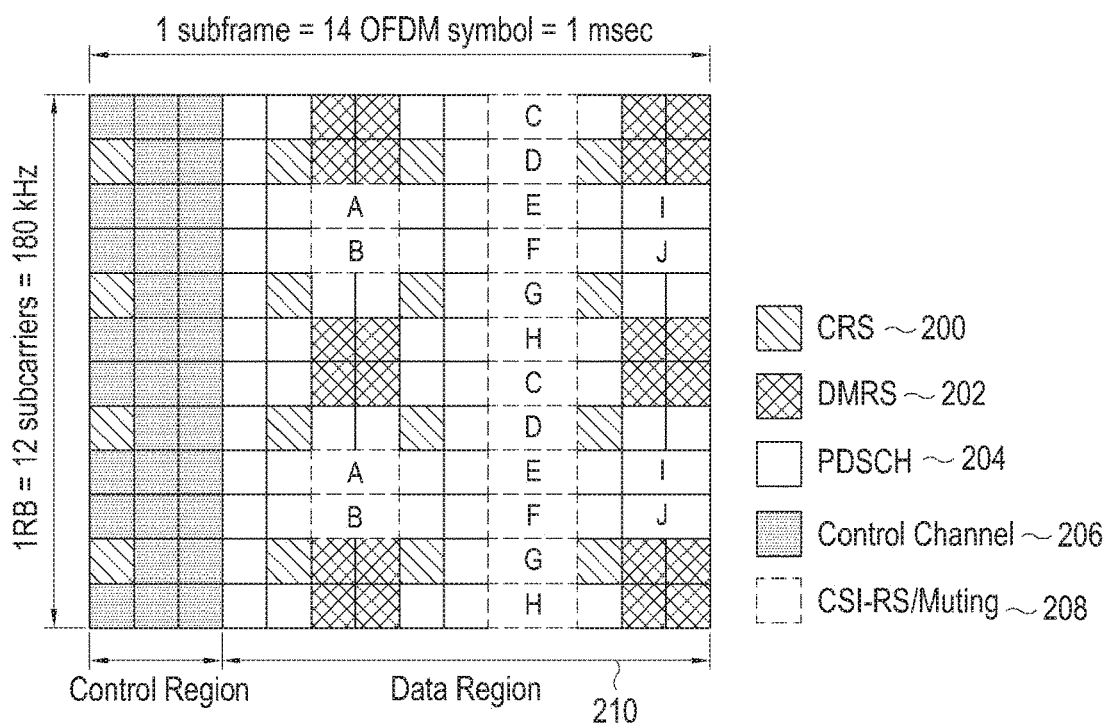
FIG. 2 illustrates one subframe, which is a minimal unit scheduled for a downlink (DL), and radio resources of one resource block (RB) in a long term evolution (LTE)/LTE-advanced (LTE-A) system according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

While a description will be focused on an orthogonal frequency division multiplexing (OFDM)-based wireless communication system, especially, the $3^{rd}$ generation partnership project (3GPP) evolved universal terrestrial radio access (EUTRA) standard, when embodiments of the present disclosure are described, a main subject matter to be claimed in the specification is also applicable to other communication systems and services having a similar technical background without significantly departing from a range disclosed herein, as will be obvious to those of ordinary skill in the art.

Before a detailed description of the present disclosure is provided, examples of interpretable meanings will be provided for several terms used herein. However, it should be noted that the meanings of the terms are not limited to the examples provided below.

A base station (BS) is an entity that communicates with a user equipment (UE), and may also be referred to as a BS, a nodeB (NB), an evolved NB (eNB), an access point (AP), and the like.

The UE is an entity that communicates with the BS, and may also be referred to as a UE, a mobile station (MS), a mobile equipment (ME), a device, a terminal, and the like.

As described above, a full dimensional multiple input multiple output (FD-MIMO) BS configures a reference signal resource that measures channels of 8 or more antennas and transmits the reference signal resource to the UE, and in this case, the number of reference signals may vary with a BS antenna configuration and measurement type. For example, in the long term evolution (LTE)/LTE-advanced (LTE-A) release 13, {1, 2, 4, 8, 12, 16}-port channel state information reference signal (CSI-RS) may be set assuming full port mapping. Herein, full-port mapping means that all transceiver radio unit transceiver radio units (TXRUs) have dedicated CSI-RS ports for channel estimation.

Figure 3:
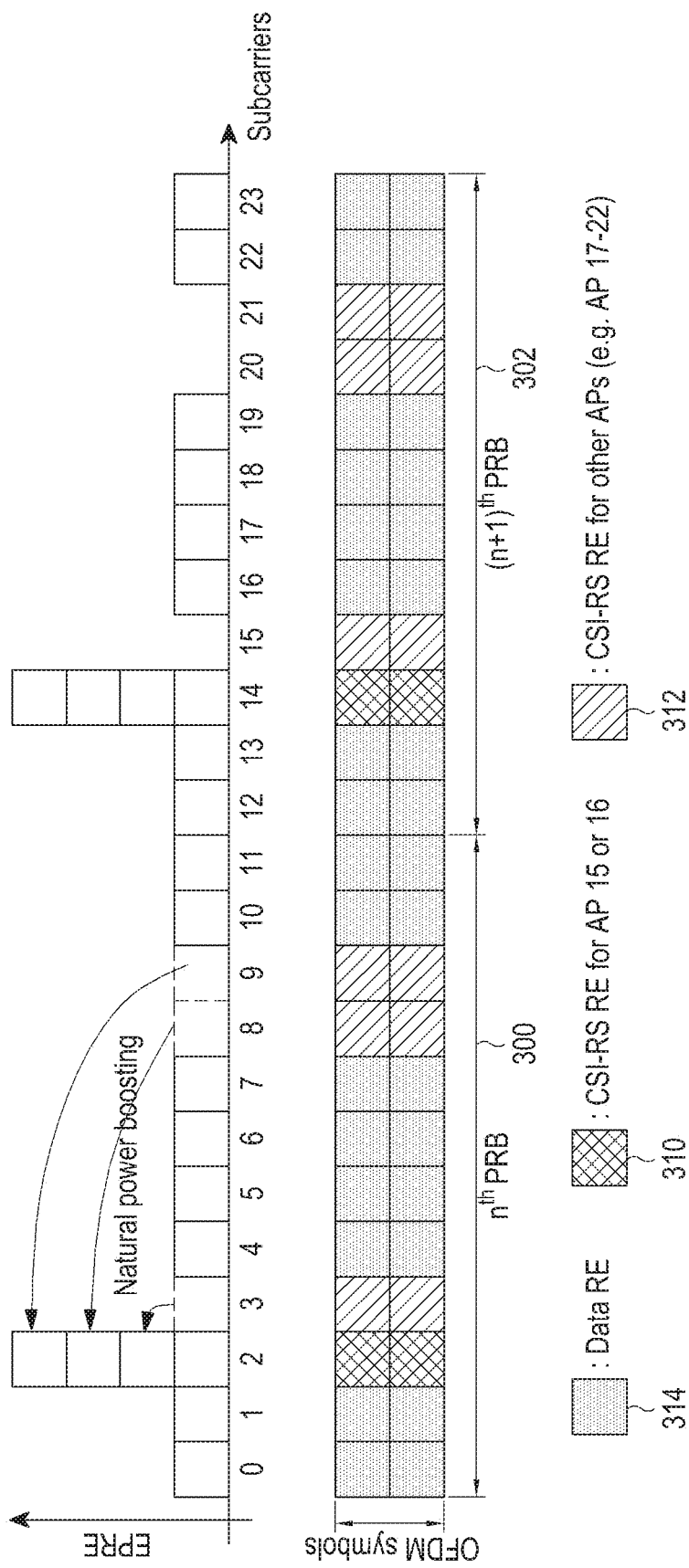
FIG. 3 illustrates a channel status indication reference signal (CSI-RS) resource element (RE) mapping for $n^{th}$ and $(n+1)^{th}$ physical RBs (PRBs) when an evolved nodeB (eNB) transmits 8 CSI-RSs according to the related art.

In the LTE/LTE-A release 13, 1, 2, 4, 8, 12, or 16 CSI-RS ports may be configured in one CSI process. More specifically, {1, 2, 4, 8}-port CSI-RS follows an existing mapping rule, a 12-port CSI-RS is configured by aggregation of three 4-port CSI-RS patterns, and a 16-port CSI-RS is configured by aggregation of two 8-port CSI-RS patterns. In the LTE/LTE-A release 13, code division multiplexing (CDM)-2 or CDM-4 is supported using an orthogonal cover code (OCC) having a length of 2 or 4 with respect to 12-port/16-port CSI-RS. FIG. 3 illustrates an example of CSI-RS power boosting based on CDM-2 using an OCC with a length of 2, and according to the description, a maximum of 9 dB power boosting when compared to PDSCH is needed for full power utilization for CDM-2-based 12-port/16-port CSI-RS. This means that higher-performance hardware is needed for full power utilization when CDM-2-based 12-port/16-port CSI-RS is used. The LTE release 13 introduces 12-port/16-port CSI-RS based on CDM-4 using an OCC with a length of 4 considering the above points, and in this case, full power utilization becomes possible through 6 dB power boosting.

As described above, standards following LTE/LTE-A release 14 are highly likely to adopt 16 or more CSI-RS antenna ports. The type of supportable antenna arrangement may also be extended largely when compared to the release 13. This means that the LTE/LTE-A release 14 needs to be able to support various numbers of CSI-RS antenna ports.

Table 1 illustrates an available two-dimensional (2D) antenna arrangement structure list according to the number of CSI-RS ports in a full port mapping context. In Table 1, {18, 20, 22, 24, 26, 28, 30, 32}-port CSI-RSs are considered, and given that two different polarized antennas may exist in the same position in a polarized antenna structure, {9, 10, 11, 12, 13, 14, 15, 16} different AP positions may be considered. Meanwhile, by using the number of different AP positions, N1, in a first dimension (e.g., a vertical direction of the 2D antenna of FIG. 1), and the number of different AP positions, N2 in a second dimension (e.g., a horizontal direction of the 2D antenna of FIG. 1), a form of 2D rectangular or square antenna arrangement, such as (N1, N2) may be expressed. A possible combination for each port number is (N1, N2) of Table 1.

Table 1 describes that antenna array geometries corresponding to various cases may exist depending on the number of aggregated CSI-RS ports in a full-port mapping context.

TABLE 1

| Number of aggregated CSI-RS ports | Number of aggregated CSI-RS ports per polarization | Available 2D antenna array geometry, (N1, N2) (1D configurations were omitted) | | | | Impact on 2D RS and feedback design |
|---|---|---|---|---|---|---|
| 18 | 9  | (3, 3) | —      | —      | —      | Low  |
| 20 | 10 | (2, 5) | (5, 2) | —      | —      | Med  |
| 22 | 11 | —      | —      | —      | —      | —    |
| 24 | 12 | (2, 6) | (3, 4) | (4, 3) | (6, 2) | High |
| 26 | 13 | —      | —      | —      | —      | —    |
| 28 | 14 | (2, 7) | (7, 2) | —      | —      | Med  |
| 30 | 15 | (3, 5) | (5, 3) | —      | —      | Med  |
| 32 | 16 | (2, 8) | (4, 4) | (8, 2) | —      | High |

As described above, to support 16 or more CSI-RS ports, the following matters need to be considered.

- A CSI-RS configuration method including a large number of ports suitable for various 2D antenna arrangement shapes including a cross polarization structure or a dual polarization structure and channel conditions.
- A method for reducing CSI-RS resource overhead due to a large number of CSI-RS ports.

In the embodiment of the present disclosure described below, at least one of the above-described matters may be considered to describe a method for configuring multiple CSI-RS ports. Although the following embodiments have been separately described for convenience, they are not independent of each other and two or more embodiments may be combined for application.

Herein, a time-frequency resource region including all or some of set CSI-RS ports will be expressed as a CSI-RS physical resource block (PRB) pair or CSI-RS PRB, and this may be expressed to have various similar meanings, such as a CSI-RS subframe, a CSI-RS sub-band, a CSI-RS bandwidth, and the like.

In an embodiment of the present disclosure, a scheme for restricting CSI generation using some of RSs transmitted in the entire band and/or the entire RS subframe is expressed as frequency comb/time comb transmission, but it may also be referred to as another similar expression, such as frequency/time measurement restriction, a frequency/time measurement window, and the like.

First Embodiment

One way to reduce CSI-RS resource overhead is reducing the density of a CSI-RS resource element (RE). To this end, CSI-RS transmission resources may be decomposed into several groups including different time or frequency resources, and each CSI-RS ports may be configured to be transmitted only in some of those groups.

In the standard up to the LTE/LTE-A release 13, the CSI-RS is transmitted in the entire band and the PRB in which the CSI-RS is transmitted is set to include the CSI-RS RE for all CSI-RSs. For example, the density of the CSI-RS RE is 1RE/port/PRB. Meanwhile, methods shown in FIGS. 4A and 4B may be used to support a larger number of (16 or more) CSI-RS ports, to provide a UE-specific beamformed CSI-RS to multiple UEs, or to provide many types of cell-specific beamformed CSI-RSs.

Figures 4A, 4B:
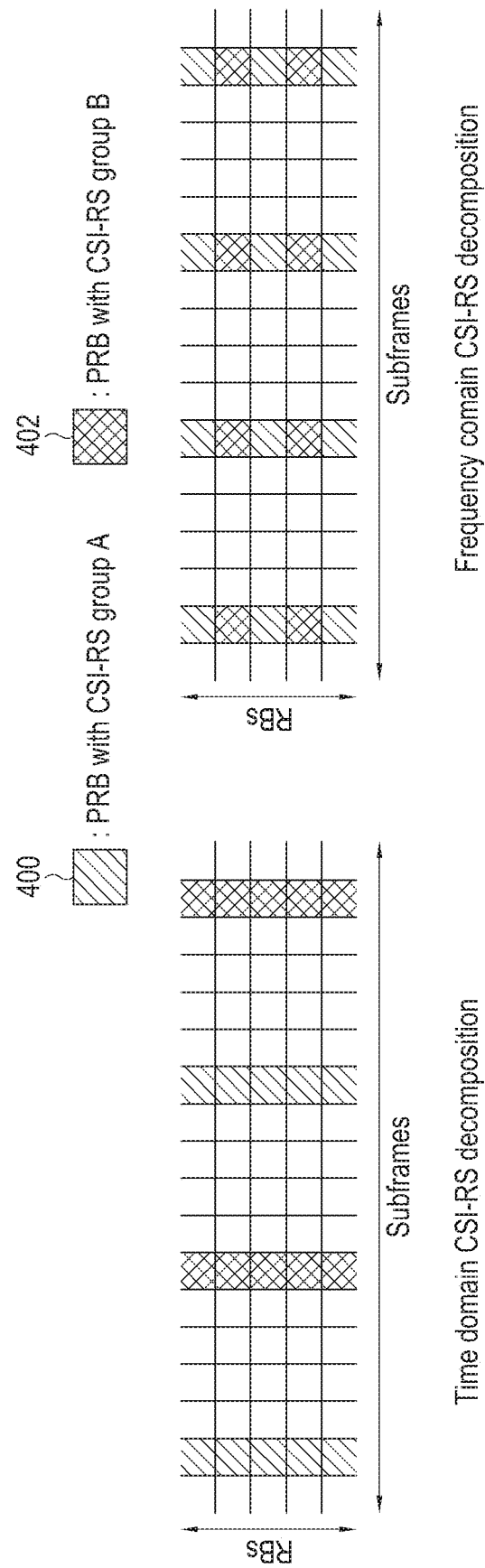
FIGS. 4A and 4B illustrate an embodiment in which a CSI-RS transmission resource is divided into a plurality of sub-groups in a time or frequency domain according to various embodiments of the present disclosure.

FIGS. 4A and 4B illustrate an embodiment in which a CSI-RS transmission resource is divided into a plurality of sub-groups in a time or frequency domain according to various embodiments of the present disclosure.

Referring to FIGS. 4A and 4B, all CSI-RS ports may be decomposed into two or more subgroups according to a certain criterion. The CSI-RS subgroup is explicitly notified to the UE by higher layer signaling or physical-layer signaling or explicitly or implicitly notified based on lists of one or more CSI-RS resource configurations or one or more CSI-RS configuration lists. The decomposed CSI-RS ports may be transmitted in different resources for different subgroups.

For example, it is assumed that all CSI-RS ports are decomposed into two subgroups, group A and group B. In FIGS. 4A and 4B, dashed PRBs 400 are PRBs in which a CSI-RS belonging to a group A is transmitted, and check-pattern PRBs 402 are PRBs in which a CSI-RS belonging to a group B is transmitted. The CSI-RSs belonging to the group A and the group B are transmitted over the entire band on a frequency axis as shown in FIG. 4A, but they may be transmitted distributed in different time resources (subframes for CSI-RS transmission, i.e., CSI-RS subframes) instead of being transmitted in all time resources (the CSI-RS subframes). Alternatively, as shown in FIG. 4B, the CSI-RSs belonging to the group A and the group B may be transmitted in all CSI-RS subframes, but may also be transmitted in different PRBs on the frequency axis. In FIGS. 4A and 4B, a distribution ratio of time resources or frequency resources is not necessarily identical for each CSI-RS port subgroup, and thus, more resources may be allocated to an important subgroup.

The above example may also be interpreted as described below. All CSI-RS REs may be decomposed into two or more subgroups according to a certain criterion. The CSI-RS RE subgroup is explicitly notified to the UE by higher layer signaling or physical-layer signaling or explicitly/implicitly notified based on lists of one or more CSI-RS resource configurations or one or more CSI-RS configuration lists. Each CSI-RS port may be transmitted in at least one of the decomposed CSI-RS RE subgroups. For example, it is assumed that all CSI-RS REs are decomposed into two subgroups, the group A and the group B. In this case, the CSI-RSs ports transmitted in the group A and the group B are transmitted over the entire band, but may be transmitted in different time resources (subframes) in FIG. 4A. Alternatively, as shown in FIG. 4B, the CSI-RSs may be transmitted over all CSI-RS subframes, but may also be transmitted in different PRBs. FIGS. 4A and 4B illustrate an example for an easy description, and distribution of time resources and distribution of frequency resources are not necessarily identical for each CSI-RS RE subgroup as shown in FIGS. 4A and 4B, and thus, more resources may be allocated to an important subgroup.

As described above, in an embodiment of the present disclosure, the CSI-RS subgroup may be interpreted as a port subgroup or an RE subgroup, and one method may be converted into another method in a similar way. Thus, in the following description, a term is collectively referred to as 'subgroup' or 'CSI-RS subgroup'.

FIGS. 4A and 4B illustrate a subgroup configuration having a comb type on a time or frequency axis, and such subgroup configuration equalizes an RS interval and thus simplifies UE implementation. However, actual subgroup configuration is not necessarily limited to a comb type, and pre-agreement may be made for transmission in a particular band for each subgroup, such as localized transmission, and the like.

An example for configuring the CSI-RS subgroup (or a component CSI-RS resource) may be grouping CSI-RS ports for each first or second direction (vertical or horizontal direction) or for each polarization. The eNB may configure a CSI-RS port index included in the subgroup through signaling to the UE, and the signaling may include both higher-layer signaling and physical-layer signaling. The method for configuring the CSI-RS subgroup may be applied variously according to antenna arrangement geometry or a channel condition. For example, when a first-direction array size $N_1$ is smaller than a second-direction array size $N_2$, system performance may be affected more by a second-direction component. Alternatively, if an antenna arrangement size is very large and channels of several UEs have to be distinguished by a direction component instead of a co-phasing component, then a subgroup may be configured for each polarization to accurately measure a direction component.

FIGS. 5A, 5B, and 5C illustrate CSI-RS sub-group generation for full-port mapping and partial-port mapping in an environment where 20 TXRUs exist according to various embodiments of the present disclosure.

Referring to FIGS. 5A, 5B, and 5C, a first CSI-RS subgroup is expressed by a quadrangle having a pattern 500, a second CSI-RS subgroup is expressed by a quadrangle having a pattern 502, and a third CSI-RS subgroup is expressed by a quadrangle having a pattern 504. Among lines expressing polarized antennas, sold lines indicate TXRUs allocated with CSI-RS ports in a CSI-RS subgroup and dotted lines indicate TXRUs allocated with no CSI-RS port in a CSI-RS subgroup.

Full-port mapping of FIG. 5A illustrates generation of a CSI-RS subgroup for each polarization. In FIG. 5A, 10 CSI-RS ports corresponding to −45° polarization AP ("/") are allocated to a first CSI-RS subgroup 500, and 10 CSI-RS ports corresponding to +45° polarization AP ("\") are allocated to a second CSI-RS subgroup 502.

Full-port mapping of FIG. 5B and full-port mapping of FIG. 5C show generation of a CSI-RS subgroup for each direction. According to full-port mapping of FIG. 5B, each CSI-RS subgroup may include the same number of CSI-RS ports in the horizontal (or vertical) direction. More particularly, according to full-port mapping of FIG. 5C, each CSI-RS subgroup may include various types of CSI-RS ports in the horizontal (or vertical) direction, and different subgroups may include different numbers of CSI-RS ports.

Partial-port mapping means that some TXRUs may have dedicated CSI-RS ports for channel estimation, but other some TXRUs may not have such a CSI-RS port.

Full-port mapping of FIG. 5A illustrates CSI-RS subgroup generation for each direction. In partial-port mapping of FIG. 5A, 10 horizontal-direction CSI-RS ports are included in a first CSI-RS subgroup 500, and 4 vertical-direction CSI-RS ports are included in a second CSI-RS subgroup 502. In this case, some TXRUs may not be allocated with CSI-RS ports.

Partial-port mapping of FIG. 5B illustrates CSI-RS subgroup generation for each polarization. In partial-port mapping of FIG. 5B, all −45° polarization APs are allocated to the first CSI-RS subgroup 500 without being subsampled. The UE may estimate accurate direction component information of a channel in this way. On the other hand, in the second CSI-RS subgroup 502, some of the other polarization APs (herein, +45° polarization APs) may be subsampled (sampling of some of the other polarization APs) for configuration. The UE may properly estimate co-phasing information of a channel through the other polarization APs of the second CSI-RS subgroup.

CSI-RS overhead reduction based on partial-port mapping may be achieved similarly without CSI-RS subgrouping.

FIGS. 6A and 6B illustrate partial-port mapping according to various embodiments of the present disclosure.

Referring to FIG. 6A, partial port mapping of FIG. 5A may be performed in one CSI-RS resource.

Referring to FIG. 6B, partial port mapping of FIG. 5B may be performed in one CSI-RS resource. In FIG. 6B, two CSI-RS ports 600 and 602 are configured for the +45° polarization APs.

Table 1 and the examples of FIGS. 5A, 5B, and 5C illustrate that the number of CSI-RS subgroups (or component CSI-RS resources) and the number of CSI-RS ports included in each CSI-RS subgroup may vary according to a situation. Thus, to support them, a CSI-RS resource decomposition method having a flexible structure is needed. For example, the eNB may configure a CSI-RS transmission interval and CSI-RS sub-band transmission (or configuration) differently according to each CSI-RS subgroup. Different CSI-RS subgroups may be configured with different numbers of CSI-RS ports.

One example for implementing the above scheme may define a comb configuration (i.e., time comb, $comb_T$, and/or frequency comb, $comb_F$) on the time or frequency axis. The eNB separately or simultaneously configures the time comb $comb_T$ or the frequency comb $comb_F$ and notifies the UE of a time/frequency resource in which each CSI-RS subgroup is to be transmitted. In this way, the eNB allocates a resource to each CSI-RS subgroup, and the UE transmits a CSI-RS at particular intervals defined by an allocated comb pattern, thereby alleviating the overhead problem while supporting a large number of, e.g., 32 or more CSI-RS ports.

FIG. 7 illustrates a CSI-RS configuration based on time comb $comb_T$ or frequency comb $comb_F$ according to an embodiment of the present disclosure.

Referring to FIG. 7, the eNB may set time comb like $comb_T \in \{X, 0, 1\}$ for the time axis. In FIG. 7, it is assumed that a CSI-RS transmission interval is set to 5 ms (i.e., 5 subframes). Herein, a value X of $comb_T$ indicates that time comb is not applied, that is, a CSI-RS subgroup is transmitted in all CSI-RS subframes. The value of $comb_T$, 0, indicates that a CSI-RS subgroup is transmitted in an odd CSI-RS subframe, and the value of $comb_T$, 1, indicates that a CSI-RS subgroup is transmitted in an even CSI-RS subframe. The meanings of X, 0, and 1 are examples of settings of time comb, and obviously, they may be agreed to have various meanings when actually applied.

In the example of FIG. 7, a CSI-RS transmission PRB of a group A is expressed as a PRB having a pattern 700, a CSI-RS transmission PRB of a group B is expressed as a PRB having a pattern 702, and a CSI-RS transmission PRB of a group C is expressed as a PRB having a pattern 704. The time comb of the first CSI-RS group A is set to $comb_T=X$, such that CSI-RS ports belonging to the group A are transmitted in all CSI-RS subframes (that is, the group A is transmitted in all CSI-RS subframes existing in every 5 ms). Meanwhile, the time comb of the second CSI-RS subgroup B and the time comb of the third CSI-RS subgroup C are set to 0 and 1, respectively, such that CSI-RS ports belonging to the subgroup B are transmitted every 10 ms in odd CSI-RS subframes, and CSI-RS ports belonging to the subgroup C are transmitted every 10 ms in even CSI-RS subframes.

For the frequency comb, application similar to the time comb is possible. In the example of FIG. 7, the eNB may set the frequency comb like $comb_F \in \{X, 0, 1\}$ for the frequency axis. Herein, X indicates that the frequency comb is not applied, that is, a CSI-RS subgroup is transmitted in every PRB. 0 indicates that a CSI-RS subgroup is transmitted in odd PRBs, and 1 indicates that a CSI-RS subgroup is transmitted in even PRBs. The meanings of X, 0, and 1 are examples of settings of the frequency comb, and obviously, they are agreed to have various meanings, e.g., several PRB group units, when actually applied.

In the example of FIG. 7, the frequency comb of the first CSI-RS subgroup A is set to $comb_F=0$, such that CSI-RS ports belonging to the subgroup A are transmitted in odd PRBs. Meanwhile, the frequency comb of the second CSI-RS subgroup B and the frequency comb of the third CSI-RS subgroup C are set to 1, such that the CSI-RS ports belonging to the group B and the group C are transmitted in even PRBs (i.e., a $0^{th}$ PRB, a $2^{nd}$ PRB, . . . ).

Another example of CSI-RS subgroup configuration is explicitly configuring CSI-RS resources used for transmission of each CSI-RS subgroup. In this example, CSI-RS configuration information, such as a CSI-RS transmission interval, a transmission offset, a CSI-RS resource index or a list of the indices, information about a CSI-RS transmission band, and the like, may be configured separately for each CSI-RS subgroup.

The eNB may notify the UE of which CSI-RS port is included in which CSI-RS subgroup through higher-layer signaling or physical-layer signaling.

Referring to IEs of an LTE/LTE-A release 13-based radio resource control (RRC) signaling message, a method for defining and expressing a CSI-RS subgroup will be described.

Table 2 illustrates CSI-RS comb type configuration based on a CSI-process IE.

TABLE 2

-- ASN1START
CSI-Process-r11 ::=SEQUENCE {
csi-ProcessId-r11CSI-ProcessId-r11,
csi-RS-ConfigNZPId-r11CSI-RS-ConfigNZPId-r11,
csi-IM-ConfigId-r11CSI-IM-ConfigId-r11,
p-C-AndCBSRList-r11SEQUENCE (SIZE (1..2)) OF P-C-AndCBSR-r11,
cqi-ReportBothProc-r11CQI-ReportBothProc-r11
cqi-ReportPeriodicProcId-r11INTEGER (0..maxCQI-ProcExt-r11)
cqi-ReportAperiodicProc-r11CQI-ReportAperiodicProc-r11
...,
[[cqi-ReportAperiodicProc-v1310CHOICE {
releaseNULL,
setupCQI-ReportAperiodicProc-v1310
}
cqi-ReportAperiodicProc2-v1310CHOICE {
releaseNULL,
setupCQI-ReportAperiodicProc-v1310
}
eMIMO-Type-r13CSI-RS-ConfigEMIMO-r13
]]
[[transmissionComb-FreqINTEGER{0..X}→ (2-1-00)
transmissionComb-TimeINTEGER{0..Y}→ (2-1-01)
]]
}
-
-- ASN1STOP Table 3 illustrates CSI-RS comb type configuration based on a CSI-RS-Config IE.

TABLE 3

```
-- ASN1START
CSI-RS-Config-r10 ::=SEQUENCE {
csi-RS-r10CHOICE {
releaseNULL,
setupSEQUENCE {
antennaPortsCount-r10ENUMERATED {an1, an2, an4, an8},
resourceConfig-r10INTEGER (0..31),
subframeConfig-r10INTEGER (0..154),
p-C-r10INTEGER (-8..15)
}
}
zeroTxPowerCSI-RS-r10ZeroTxPowerCSI-RS-Conf-r12
[[transmissionComb-FreqINTEGER{0..X}→ (2-2-00)
transmissionComb-TimeINTEGER{0..Y}→ (2-2-01)
]]
}
CSI-RS-Config-v1250 ::=SEQUENCE {
zeroTxPowerCSI-RS2-r12ZeroTxPowerCSI-RS-Conf-r12
ds-zeroTxPowerCSI-RS-r12CHOICE {
releaseNULL,
setupSEQUENCE {
zeroTxPoworCSI-RS-List-r12SEQUENCE (SIZE (1..maxDS-ZTP-CSI-RS-r12)) OF ZeroTxPoworCSI-RS-r12
}
}
}
CSI-RS-Config-v1310 ::=SEQUENCE {
eMIMO-Type-r13CSI-RS-ConfigEMIMO-r13
[[transmissionComb-FreqINTEGER{0..X}→ (2-2-02)
transmissionComb-TimeINTEGER{0..Y}→ (2-2-03)
]]
}
CSI-RS-ConfigEMIMO-r13 ::=CHOICE {
releaseNULL,
setupCHOICE {
nonPrecoded-r13CSI-RS-ConfigNonPrecoded-r13,
beamformed-r13CSI-RS-ConfigBeamformed-r13
}
}
CSI-Rs-configNonPrecoded-r13 ::=SEQUENCE {
p-C-AndCBSRList-r13P-C-AndCBSR-PerResourceConfig-r13
codebookConfigN1-r13ENUMERATED {n1, n2, n3, n4, n8},
codebookConfigN2-r13ENUMERATED {n1, n2, n3, n4, n8},
codebookOverSamplingRateConfig-O1-r13ENUMERATED {n4, n8}
codebookOverSamplingRateConfig-O2-r13ENUMERATED {n4,n8}
codebookConfig-r13INTEGER (1..4),
csi-IM-ConfigIdList-r13SEQUENCE (SIZE (1..2)) OF CSI-IM-ConfigId-r13
csi-RS-ConfigNZP-EMIMO-r13CSI-RS-ConfigNZP-EMIMO-r13
[[NZP-TransmissionCombListSEQUENCE (SIZE (1..2)) OF NZP-TransmissionComb
→ (2-2-04)
IM-TransmissionCombListSEQUENCE (SIZE (1..2)) OF IM-TransmissionComb
→ (2-2-05)
]]
}
CSI-RS-ConfigBeamformed-r13 ::=SEQUENCE{
csi-RS-ConfigNZPIdListExt-r13 SEQUENCE (SIZE (1..7)) OF CSI-RS-ConfigNZPId-r13
csi-IM-ConfigIdList-r13SEQUENCE (SIZE (1..8)) OF CSI-IM-ConfigId-r13
p-C-AndCBSR-PerResourceConfigList-r13SEQUENCE (SIZE (1..8)) OF P-C-AndCBSR-PerResourceConfig-r13
ace-For4Tx-PerResourceConfigList-r13SEQUENCE (SIZE (1..7)) OF BOOLEAN
alternativeCodebookEnabledBeamformed-r13ENUMERATED {true}
channelMeasRestriction-r13ENUMERATED {on}
[[NZP-TransmissionCombListSEQUENCE (SIZE (1..7)) OF NZP-TransmissionComb
→ (2-2-06)
IM-TransmissionCombListSEQUENCE (SIZE (1..8)) OF IM-TransmissionComb
→ (2-2-07)
]]
}
ZeroTxPowerCSI-RS-Conf-r12 ::=CHOICE {
releaseNULL,
setupZeroTxPowerCSI-RS-r12
}
ZeroTxPowerCSI-RS-r12 ::=SEQUENCE {
zeroTxPoworResourceConfigList-r12BIT STRING (SIZE (16)),
zeroTxPowerSubframeConfig-r12INTEGER (0..154)
```

TABLE 3-continued

```
[[ZP-TransmissionCombListSEQUENCE (SIZE (1..16)) OF ZP-TransmissionComb
→ (2-2-08)
ZP-TransmissionCombZM-TransmissionComb→ (2-2-09)
]]
}
NZP-TransmissionComb ::=SEQUENCE {
transmissionComb-FreqTransmissionComb-Freq,→ (2-2-10)
transmissionComb-TimeTransmissionComb-Time,→ (2-2-11)
...
}
ZP-TransmissionComb ::=SEQUENCE {
transmissionComb-FreqTransmissionComb-Freq,→ (2-2-12)
transmissionComb-TimeTransmissionComb-Time,→ (2-2-13)
...
}
IM-TransmissionComb ::=SEQUENCE {
transmissionComb-FreqTransmissionComb-Freq,→ (2-2-14)
transmissionComb-TimeTransmissionComb-Time,→ (2-2-15)
...
}
TransmissionComb-Freq ::=INTEGER {0..X}→ (2-2-16)
TransmissionComb-Time ::=INTEGER {0..Y}→ (2-2-17)
-- ASN1STOP
```

Table 4 illustrates CSI-RS comb type configuration based on a CSI-RS-ConfigNZP IE.

TABLE 4

```
-- ASN1START
CSI-RS-ConfigNZP-r11 ::=SEQUENCE {
csi-RS-ConfigNZPId-r11CSI-RS-ConfigNZPId-r11,
antennaPortsCount-r11ENUMERATED {an1, an2, an4, an8},
resourceConfig-r11INTEGER (0..31),
subframeConfig-r11INTEGER (0..154),
scramblingIdentity-r11INTEGER (0..503),
qcl-CRS-Info-r11SEQUENCE {
qcl-ScramblingIdentity-r11INTEGER (0..503),
crs-PortsCount-r11ENUMERATED {n1, n2, n4, spare1},
mbsfn-SubframeConfigList-r11CHOICE {
releaseNULL,
setupSEQUENCE {
subframeConfigListMBSFN-SubframeConfigList
}
}
}
...,
[[csi-RS-ConfigNZPId-v1310CSI-RS-ConfigNZPId-v1310
]]
[[transmissionComb-FreqINTEGER {0..X}→ (2-3-00)
transmissionComb-TimeINTEGER {0..Y}→ (2-3-01)
]]
}
CSI-RS-ConfigNZP-EMIMO-r13 ::=CHOICE {
releaseNULL,
setupSEQUENCE {
nzp-resourceConfigList-r13SEQUENCE (SIZE (1..2)) OF
NZP-ResourceConfig-r13,
cdmType-r13ENUMERATED {cdm2, cdm4}
[[NZP-TransmissionCombListSEQUENCE (SIZE (1..2)) OF
NZP-TransmissionComb
→ (2-3-02)
]]
}
}
NZP-ResourceConfig-r13 ::=SEQUENCE {
resourceConfig-r13ResourceConfig-r13,
...
}
ResourceConfig-r13 ::=INTEGER (0..31)
NZP-TransmissionComb ::=SEQUENCE {
transmissionComb-FreqTransmissionComb-Freq,→ (2-3-03)
transmissionComb-TimeTransmissionComb-Time,→ (2-3-04)
...
}
```

TABLE 4-continued

```
TransmissionComb-Freq ::=INTEGER {0..X}→ (2-3-05)
TransmissionComb-Time ::=INTEGER {0..Y}→ (2-3-06)
-- ASN1STOP
```

Table 5 illustrates CSI-RS comb type configuration based on a CSI-RS-ConfigZP IE.

TABLE 5

```
-- ASN1START
CSI-RS-ConfigZP-r11 ::=SEQUENCE {
csi-RS-ConfigZPId-r11CSI-RS-ConfigZPId-r11,
resourceConfigList-r11BIT STRING (SIZE (16)),
subframeConfig-r11INTEGER (0..154),
[[ZP-TransmissionCombListSEQUENCE (SIZE (1..16)) OF
ZP-TransmissionComb
→ (2-4-00)
ZP-TransmissionCombZM-TransmissionComb→ (2-4-01)
]]
...
}
ZP-TransmissionComb ::=SEQUENCE {
transmissionComb-FreqTransmissionComb-Freq,→ (2-4-02)
transmissionComb-TimeTransmissionComb-Time,→ (2-4-03)
...
}
TransmissionComb-Freq ::=INTEGER {0..X}→ (2-4-04)
TransmissionComb-Time ::=INTEGER {0..Y}→ (2-4-05)
-- ASN1STOP
```

Referring to Tables 2 through 5, a CSI process may include at least one CSI-RS resource configuration that may include multiple CSI-RS configurations. Each CSI-RS resource may be configured with one of a non-precoded CSI-RS (refer to 'nonPrecoded-r13' of Table 3) and a beamformed CSI-RS (refer to 'beamformed-r13' of Table 3).

If a CSI-RS is configured as a non-precoded CSI-RS, multiple CSI-RS resources in which the CSI-RS is aggregated for transmission through multiple ports are used. A CSI-RS resource configuration configured with non-precoded CSI-RSs includes at least one CSI-RS configuration, and each CSI-RS configuration includes as many CSI-RS REs as annteaPortsCount. For example, when one non-precoded CSI-RS has N CSI-RS configurations, for antennaPortsCount=P, a total number of CSI-RS REs used for the non-precoded CSI-RS is N*P. For the non-precoded CSI-RS, the unit of the CSI-RS subgroup may be a CSI-RS resource configuration or CSI-RS configuration.

If the unit of the CSI-RS subgroup is a CSI-RS resource configuration, this means that an identical subgroup configuration is applied to multiple CSI-RS configurations of one CSI-RS resource configuration. If the CSI-RS subgroup includes a time/frequency comb type, an RRC parameter, such as 'transmissionComb-Freq' (2-1-00) or 'transmissionComb-Time' (2-1-01) of Table 2 may be added for a transmission mode 10 (TM10) UE. In Table 2, 'transmissionComb-Freq' signals a type of a subgroup in a frequency domain, and 'transmissionComb-Time' signals a type of a subgroup in a time domain. Values of the parameters, X and Y, mean the number of comb offsets (comb type, subgroup type) in the frequency domain and in the time domain, respectively. For example, if two comb offsets are supported in the frequency domain and no comb offset does not exist in the time domain (i.e., in case of CSI-RS density=0.5 RE/port/PRB), then X is 1 (i.e., transmissionComb-Freq=0 or 1) and 'transmissionComb-Time' (2-1-01) may not be either set or defined. Meanwhile, the value X of 'TransmissionComb-Freq' (2-1-00) that determines CSI-RS transmission frequency comb may differ according to whether the CSI-RS is the non-precoded CSI-RS or beamformed CSI-RS. Meanwhile, the value Y of 'TransmissionComb-Time' (2-1-01) that determines time comb may differ from the non-precoded CSI-RS to the beamformed CSI-RS. The values X and Y of the parameters 'transmissionComb-F_req' (2-1-00) and 'transmissionComb-Time' (2-1-01) may change in relation to CSI-RS density. For example, for CSI-RS density=⅓, the CSI-RS may have three comb offsets because of being transmitted in every third PRBs, and in this case, X is 2 (i.e., 'transmissionComb-Freq'=0, 1, or 2).

Similarly, (2-1-00) or (2-1-01) may use processing granularity for signaling in the frequency/time domain. For example, if (2-1-00) has a value of 1, this may mean that frequency measurement restriction is on and independent channel estimation has to be performed for each PRB or channel estimation has to be performed for each PRB group. In another example, if (2-1-00) has a value of 4, this may mean that frequency measurement restriction is on and channel estimation is performed for each group of four PRBs. Referring to Table 3, for a TM9 UE, a CSI process is not configured, such that a frequency or time domain subgroup type may be signaled through a CSI-RS configuration, such as 'transmissionComb-Freq' (2-2-00) or 'transmissionComb-Time' (2-2-01). A detailed description is similar to the TM10 UE and thus will be omitted.

In another example, if the unit of a CSI-RS subgroup is a CSI-RS configuration, this means that independent subgroup configurations are applied to separate CSI-RS configurations. Also in this case, an identical subgroup type may be applied to all CSI-RS configurations according to a higher layer configuration. In Table 2, one CSI process is configured with 'nonPrecoded-r13' (non-precoded CSI-RS) or 'beamformed-r13' (beamformed CSI-RS) of Table 3 by RRC parameter 'eMIMO-Type-r13'. For example, if the UE is configured with the non-precoded CSI-RS, the UE combines one of 'resourceConfig-r10' of Table 3 and 'resourceConfig-r11' of Table 4 with 'nzp-resourceConfig-List-r13' of Table 4, such that one CSI-RS resource may be configured. 'nzp-resourceConfigList-r13' means the number of resources that may be additionally combined. Herein, if 20-port and 28-port are used for CSI-RS transmission, transmission may be performed by aggregating five and seven 4-port patterns, respectively, and for 24-port and 32-port, transmission may be performed by aggregating three and four 8-port patterns, respectively, such that to express a maximum value of 7 among the numbers, 'nzp-resourceConfigList-r13' may be changed from the current Sequence (SIZE (1 . . . 2)) to Sequence (SIZE (1 . . . 6)). In the current example, to allow different subgroup designations for each resourceConfig, RRC parameters, such as (23-00), (2-2-01), (2-2-02), (2-2-03), (2-2-04), (2-2-10), (2-2-11), (2-2-16), and (2-2-17) of Table 3 may be defined. (2-2-16) and (2-2-17) signal comb offset values (or subgroup types) in frequency/time domains, respectively, and values X and Y indicate the numbers of comb offsets (or subgroup types) in respective domains, respectively. A detailed description thereof will refer to the above examples. The signaling may be mapped to each CSI-RS configuration (resourceConfig), such as (2-2-02), (2-2-03), and (2-2-04) through (2-2-10) or (2-2-11). (2-2-04) may be defined like (2-3-02) of Table 4.

Meanwhile, the UE may be configured with the beamformed CSI-RS. For the beamformed CSI-RS, at least one CSI-RS resource configuration may be configured in one CSI process. If the CSI-RS is configured with the beamformed CSI-RS, the CSI-RS is indicated to use any one of one or more CSI-RS resource configurations. In this case, each CSI-RS resource configuration includes one CSI-RS configuration value. More specifically, the UE may receive one to eight CSI-RS configurations (resourceConfig) through one of 'resourceConfig-r10' of Table 3 and 'resourceConfig-r11' of Table 4 and 'csi-RS-ConfigNZPIdListExt' of Table 3. In the current example, to allow different subgroup designations for each resourceConfig, RRC parameters, such as (2-2-00), (2-2-01), (2-2-02), (2-2-03), (2-2-06), (2-2-10), (2-2-11), (2-2-16), and (2-2-17) of Table 3 may be defined. For the beamformed CSI-RS, one subgroup configuration for each CSI-RS resource configuration is possible, such that CSI-RS ports included in the same CSI-RS resource configuration are not included in different subgroups. A relationship between parameters is similar with the non-precoded CSI-RS and thus will not be described in detail.

Herein, the value X of 'TransmissionComb-Freq' (2-4-04) of Table 5 may differ according to whether the CSI-RS is the non-precoded CSI-RS or beamformed CSI-RS.

The above examples have been described based on the non-zero power (NZP) CSI-RS configuration, but the same subgroup as the NZP CSI-RS is also applicable to zero power (ZP) CSI-RS and CSI interference measurement (CSI-IM). ZP CSI-RS and CSI-IM may be used to reduce CSI-RS inter-cell interference or measure interference by using the CSI-RS resource. Thus, if the CSI-RS is transmitted according to the subgroup configuration, proper subgroup configuration needs to be applied to ZP CSI-RS and CSI-IM correspondingly. The RRC parameters for this end may be defined like (2-2-05), (2-2-07), (2-2-08), (2-2-09), (2-2-12), (2-2-13), (2-2-14), and (2-2-15) of Table 3 and (2-4-00), (2-4-01), (2-4-02), (2-4-03), (2-4-04), and (2-4-05) of Table 5. A relationship between parameters is similar with the NZP CSI-RS and thus will not be described in detail. (2-4-00) and (2-4-01) may be configured at the same time or may not be defined. (2-4-00) may configure different subgroups for four port CSI-RSs indicated by each ZP CSI-RS resourceConfigList, and (2-4-01) may configure an identical subgroup in all 4 port CSI-RSs indicated by a 16-bit ZP CSI-RS resourceConfigList bitmap.

The RRC parameters in the embodiment are defined assuming that CSI-RS transmission of a comb type in the frequency and time domains is supported, and when actually applied, they are not limited to the examples. For example, only subgroup configuration in the frequency domain may be supported and a subgroup type may also be defined as various other terms, such as frequency domain measurement restriction, and the like. In this case, the RRC parameters may be interpreted and defined with other proper expressions.

Second Embodiment

The second embodiment proposed in an embodiment of the present disclosure will be described with reference to FIGS. 8A, 8B, 9A, 9B, 9C, and 9D.

FIGS. 8A and 8B illustrate a channel measurement resource according to a second embodiment of the present disclosure.

Referring to FIGS. 8A and 8B, the second embodiment proposes a method for configuring the entire bandwidth with channel estimation resources or selecting an arbitrary PRB pair from the entire bandwidth and configuring the arbitrary PRB pair with channel estimation resources. More specifically, the second embodiment proposes a method for arranging demodulation reference signal (DMRS) or CRS in a configured PRB pair, sequentially configuring an antenna port in an RE except for the DMRS or the CRS, starting from each frequency RE, and configuring a resource according to the number of antenna ports until RE resources of all PRBs are used. For convenience, the PRB pair configured using the above method will be referred to as a CSI-RS PRB pair. However, the CSI-RS PRB pair may include the DMRS or the CRS as well as the CSI-RS.

A symbol for which resource mapping for a CSI-RS transmission antenna port configuration begins starts from a 0th symbol, and if overlapping control channel signals are generated, an RE may not be used as a channel estimation resource. Alternatively, a symbol beginning with higher layer signaling may be indicated.

FIG. 8A illustrates a method for allocating a CRS and configuring a CSI-RS, and FIG. 8B illustrates a method for allocating a DMRS and configuring a CSI-RS. Unlike in an enhanced physical downlink control channel (EPDCCH), data decoding is not needed in the CSI-RS PRB pair, such that CRS allocation and CSI-RS configuration as shown in FIG. 8A may be useful.

In the current embodiment of the present disclosure, unlike in the first embodiment of the present disclosure, CSI-RS transmission in only some of configured PRBs as well as CSI-RS transmission in all the configured PRBs in a downlink band may be possible. In this case, some PRBs in which the CSI-RS is transmitted may be explicitly designated by higher layer signaling or physical layer signaling or may be designated according to certain rules, such as frequency hopping, and the like. Signaling for designating the CSI-RS PRB pair may be implicitly or explicitly designated by aperiodic CSI-RS triggering.

Instead of transmitting the CSI-RS in all PRBs in the entire band, the density of the CSI-RS transmitted in one PRB is increased, thereby guaranteeing the performance of channel resources. In addition, because of PRB-based multiplexing (that is, easy multiplexing with a data channel of an existing UE, i.e., a UE capable of receiving up to 8 antenna channels), the performance of the existing UE is not affected by a large number of, for example, 100 or more, antennas.

FIGS. 9A, 9B, 9C, and 9D illustrate a PRB to which a CSI-RS is mapped in a system having 32 or 64 antenna ports according to various embodiments of the present disclosure.

Figure 9A:
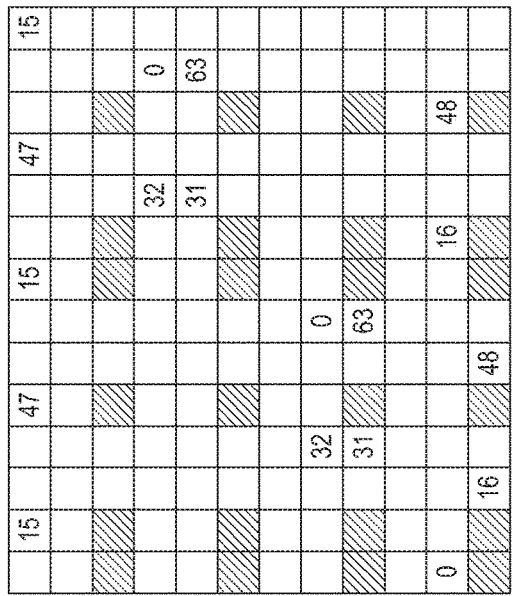
FIGS. 9A, 9B, 9C, and 9D illustrate a PRB to which a CSI-RS is mapped in a system having 32 or 64 antenna ports according to various embodiments of the present disclosure.

Referring to FIG. 9A, a method for configuring a PRB for CSI-RS in a system having a total of 32 antennas is illustrated.

Figure 9B:
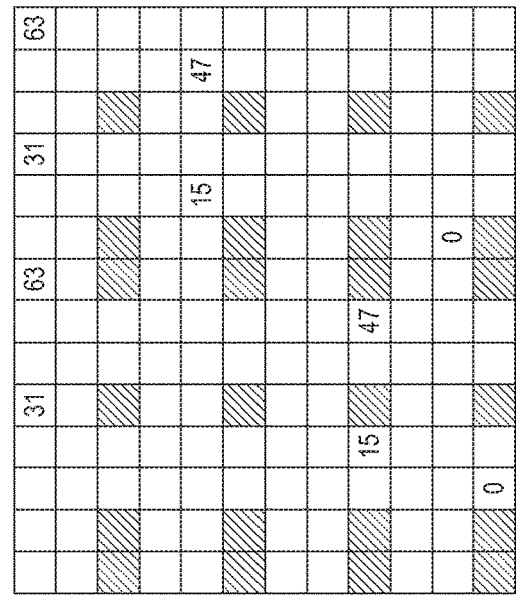

Referring to FIG. 9B, a method for configuring a PRB for CSI-RS in a system having a total of 64 antennas is illustrated.

Figure 9C:
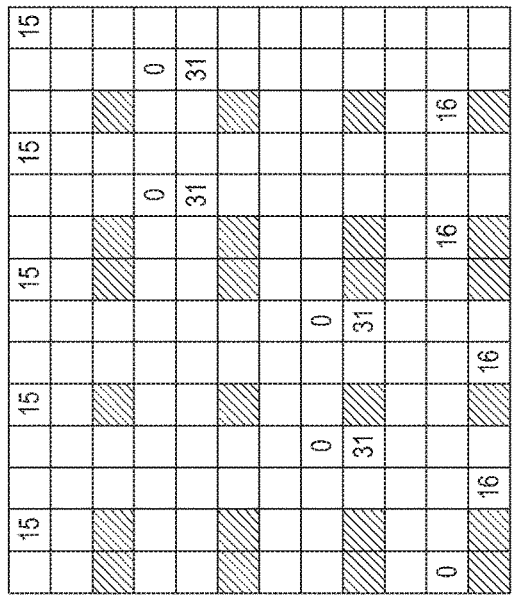

Referring to FIG. 9C, execution for 32 ports in which a time symbol for transmitting a CSI-RS resource begins with a $2^{nd}$ symbol is illustrated.

Figure 9D:
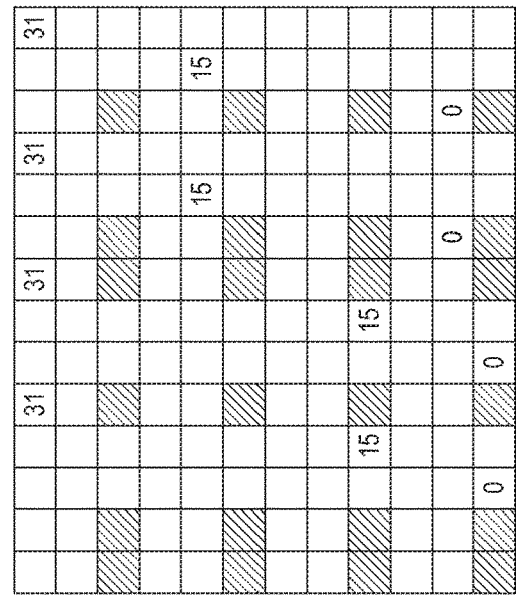

Referring to FIG. 9D, execution for 64 ports in which a time symbol for transmitting a CSI-RS resource begins with the $2^{nd}$ symbol is illustrated.

Third Embodiment

Similar to the second embodiment of the present disclosure, another method may be considered to define a CSI-RS PRB pair. The third embodiment proposed in an embodiment of the present disclosure will be described with reference to FIGS. 10A, 10B, 11A, and 11B.

Figures 10A, 10B:
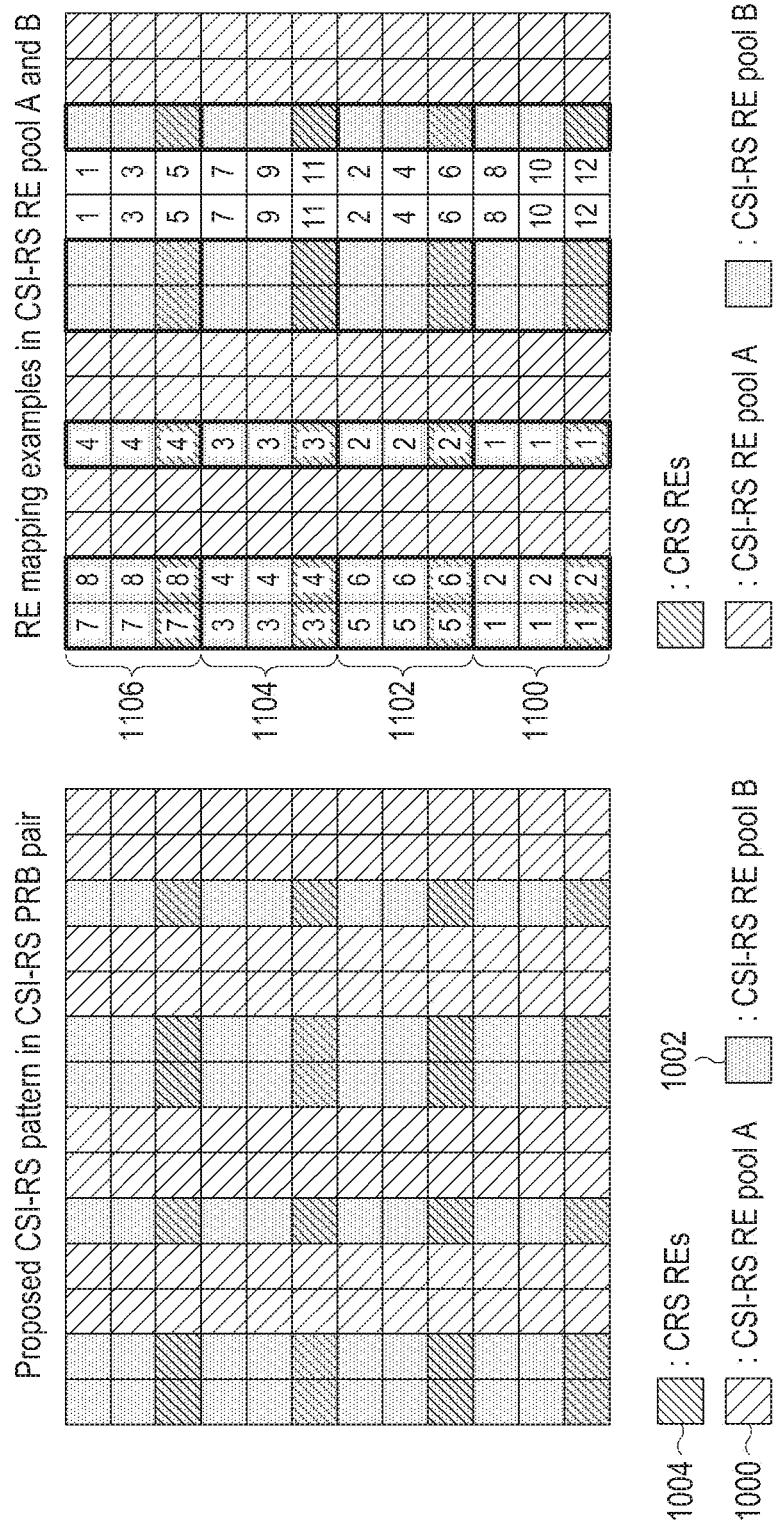
FIGS. 10A and 10B illustrate a channel measurement resource according to a third embodiment of the present disclosure.

FIGS. 10A and 10B illustrate a channel measurement resource according to a third embodiment of the present disclosure.

Referring to FIGS. 10A and 10B, one PRB is illustrated, in which a horizontal axis indicates an OFDM symbol and a vertical axis indicates a subcarrier. FIGS. 10A and 10B assume an environment where a 4-port CRS is configured.

The third embodiment proposes a method for configuring the entire bandwidth with channel measurement resources or selecting an arbitrary PRB in the entire bandwidth and configuring the PRB with channel measurement resources. More specifically, in the current embodiment of the present disclosure, a selected (or configured) CSI-RS PRB pair is classified into two CSI-RS RE pools. Each CSI-RS RE pool may be defined as a slot number or a set of OFDM symbol numbers. For example, a criterion for configuring each CSI-RS RE pool may be an OFDM symbol including a CRS and an OFDM symbol without a CRS. According to the example, as shown in FIG. 10A, a first CSI-RS RE pool A 1000 may include OFDM symbols {2, 3, 5, 6, 9, 10, 12, 13} without a CRS. Similarly, a second CSI-RS RE pool B 1002 may include OFDM symbols {0, 1, 4, 7, 8, 11} including a CRS. Herein, the 'CSI-RS RE pool' is a conceptual name, and may be replaced with various terms, such as a CSI-RS RE group, a CSI-RS subgroup, and the like.

The LTE/LTE-A supports CRS power boosting as well as the above-described CSI-RS power boosting. When CRS power boosting is applied, the transmission power of REs other than a CRS RE 1004 in the OFDM symbol in which the CRS is transmitted is limited by the CRS transmission power. This means that an OFDM symbol in which CRS RE 1004 exists, that is, an available CSI-RS power boosting level in the CSI-RS RE pool B 1002 of FIG. 10A, and an OFDM symbol in which a CRS does not exist, that is, an available CSI-RS power boosting level in the CSI-RS RE pool A 1000 may be different from each other. Meanwhile, in the current LTE-A standard, only one Pc value per CSI-RS resource may be notified to a UE. Thus, the UE may not know that CSI-RS transmission power may differ with an OFDM symbol (i.e., a CSI-RS RE pool), which may have a negative influence upon channel estimation performance.

To address this issue, specific restriction may be applied to a CSI-RS configuration, and the CSI-RS configuration restriction may be applied differently according to a CSI reporting type.

For example, in class A CSI reporting based on a non-precoded CSI-RS, when CSI-RS aggregation for configuring 8 or more multiple CSI-RS ports is performed, only a CSI-RS existing in an identical CSI-RS RE pool may be aggregated. When this method is used, all CSI-RS ports configured in one CSI-RS PRB pair may perform power boosting of an identical level, such that channel estimation may be performed through Pc signaling that is the same as an existing one.

In another example, in case of class B CSI reporting based on beamformed CSI-RS, one CSI process may include multiple CSI-RS resources configured in the CSI-RS RE pool A and the CSI-RS RE pool B. Also in this case, individual CSI-RS resources may include CSI-RS ports located in an identical CSI-RS RE pool, or each Pc may be configured for each CSI-RS resource or for each CSI-RS resource pool. Thus, the UE may select a CSI-RS indicator (CRI) and calculate a CQI by referring to Pc corresponding to each CSI-RS resource.

FIG. 10B illustrates an example of CSI-RS RE mapping in the current embodiment. In the CSI-RS RE pool A in which CRS is not transmitted, CSI-RS mapping rules that are similar with those in the existing LTE-A may be applied. For example, for OFDM symbols {2, 3}, {5, 6}, {9, 10}, and {12, 13} of the CSI-RS RE pool A, CSI-RS RE mapping rules in the OFDM symbols {9, 10} of the existing LTE-A may be applied. In this way, in the CSI-RS RE pool A, CSI-RS for legacy UEs may be transmitted together with new CSI-RS.

On the other hand, in the CSI-RS RE pool B in which CRS is transmitted, CSI-RS for legacy UEs may not be transmitted. Thus, existing CSI-RS RE mapping rules may be applied or new CSI-RS mapping rules may be defined. For example, as shown in FIG. 10B, for OFDM symbols {0, 1}, {4}, {7, 8}, and {11}, subcarriers {0, 1, 2}, {3, 4, 5}, {6, 7, 8}, and {9, 10, 11} subcarriers are configured as four groups 1100, 1102, 1104, and 1106. In one subcarrier in each subcarrier group, CRS is transmitted, such that two subcarriers may be used for CSI-RS transmission in each subcarrier group. Thus, in the CSI-RS RE pool B of FIG. 10B, among three REs indicated by numbers 1, 2, 3, ..., 8, except for one RE in which CRS is transmitted, two REs may be selected, and CDM-2 is applied to the selected two REs to transmit CSI-RS similarly with an existing method. (If CDM-4 is applied, the selected two RE sets may be selected twice and grouped.) To sum up, in the CSI-RS RE pool A, like in a case of the related art, time domain CDM (CDM-T) may be used for CDM-2 (two consecutive symbols on the time axis as CDM) and time & frequency domain CDM (CDM-TF) may be used for CDM-4. On the other hand, in the CSI-RS RE pool B, frequency domain CDM (CDM-F) may be used for CDM-2 (two consecutive symbols on the time axis as CDM) and CDM-TF may be used for CDM-4.

In the current embodiment of the present disclosure, CSI-RS transmission in only some of configured PRB pairs as well as CSI-RS transmission in all the configured PRBs in a downlink band may be possible. In this case, some PRB pairs in which CSI-RS is transmitted may be explicitly designated by higher layer signaling or physical layer signaling or may be designated according to certain rules, such as frequency hopping, and the like. Signaling for designating the CSI-RS PRB pair may be implicitly or explicitly designated by aperiodic CSI-RS triggering.

Figure 11B:
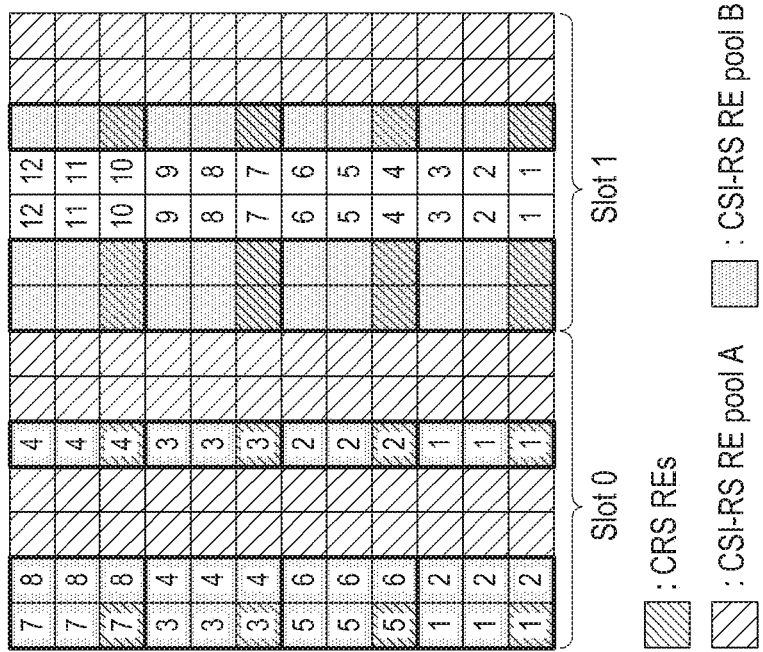
FIGS. 11A and 11B illustrate a channel measurement resource in an environment where 1-port or 2-port cell specific reference signal (CRS) is configured according to the third embodiment of the present disclosure.
Figure 11A:
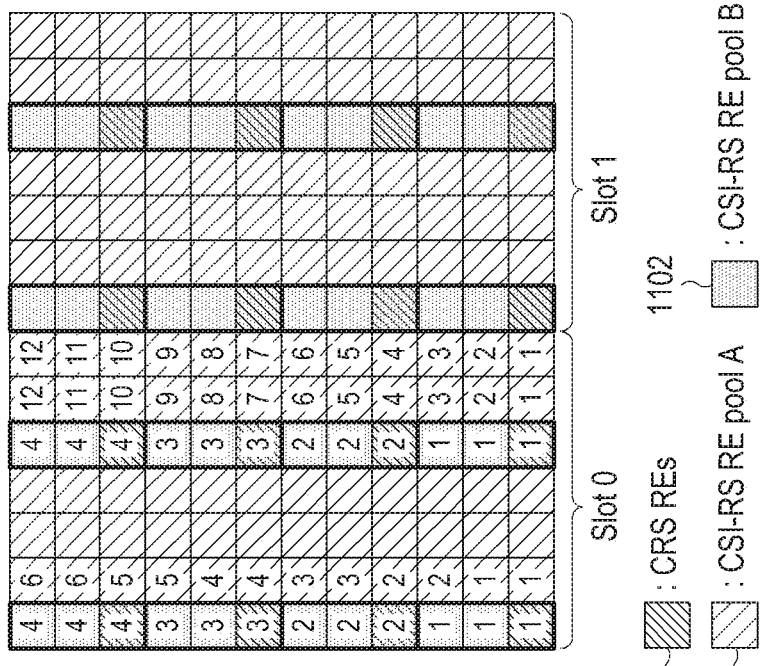

FIGS. 11A and 11B illustrate a channel measurement resource in an environment where 1-port or 2-port CRS is configured according to the third embodiment of the present disclosure.

Referring to FIGS. 11A and 11B, one PRB is illustrated, in which a horizontal axis indicates an OFDM symbol and a vertical axis indicates a subcarrier. If 1 or 2 port CRS is configured, the third embodiment may operate with one of two methods described below.

In the first method, regions of the CSI-RS RE pools A and B vary with an OFDM symbol including CRS. According to this method, if 1 or 2 port CRS is configured, first OFDM symbols (i.e., OFDM symbols {1, 8}) of slot 0 and slot 1, which do not include a CRS RE 1104, are incorporated into the CSI-RS RE pool A as shown in FIG. 11A. As a result, a CSI-RS pool A includes OFDM symbols {1, 2, 3, 5, 6, 8, 9, 10, 12, 13} corresponding to −45° dashed REs 1100 of FIG. 11A, and a CSI-RS pool B includes OFDM symbols {0, 4, 7, 11} corresponding to dotted REs 1102 including a CRS RE in FIG. 11A. CSI-RS RE mapping in the first OFDM symbols (OFDM symbols {1, 8}) of slot 0 and slot 1, which do not include the CRS RE 1104, may use CDM-F as shown in FIG. 11A. This is intended to maintain a CSI-RS mapping method considering legacy UEs while maintaining consistency with a mapping method in a 4-port CRS environment.

In the second method, the regions of the CSI-RS RE pools A and B are defined regardless of the number of CRS ports. According to this method, the first OFDM symbols (i.e., OFDM symbols {1, 8}) of slot 0 and slot 1, which do not include a CRS RE, are incorporated into the CSI-RS RE pool B as shown in FIG. 11B (that is, belong to the CSI-RS RE pool B regardless of whether CRS port exists). In the second method, CSI-RS RE mapping may use the same method as described in the example of FIGS. 10A and 10B. The second method is simpler than the first method, but multiple Pc configurations may be needed for full power utilization in the OFDM symbols {1, 8}.

Fourth Embodiment

The fourth embodiment proposed will be described with reference to FIGS. 12A and 12B.

Figure 12A:
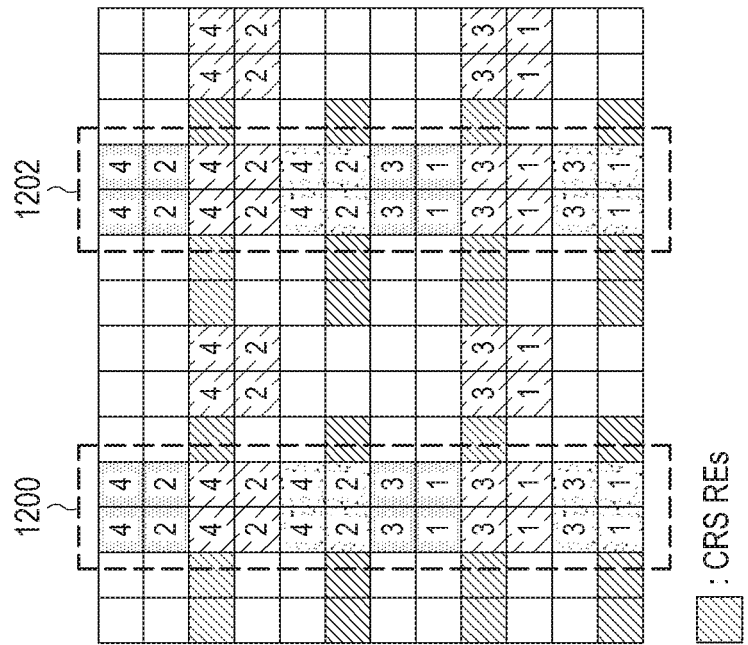
FIGS. 12A and 12B illustrate a channel measurement resource according to a fourth embodiment of the present disclosure.
Figure 12B:
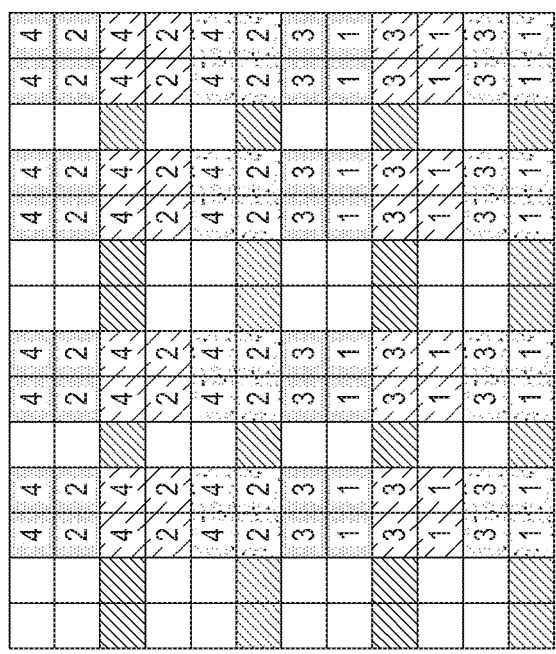

FIGS. 12A and 12B illustrate a channel measurement resource according to a fourth embodiment of the present disclosure.

Referring to FIGS. 12A and 12B, one PRB is illustrated, in which a horizontal axis indicates an OFDM symbol and a vertical axis indicates a subcarrier. The fourth embodiment may additionally use OFDM symbols {2, 3} to configure CSI-RS.

For example, referring to FIG. 12A, in OFDM symbols {2, 3}, {5, 6}, {9, 10}, and {12, 13}, CSI-RS mapping in the OFDM symbols {9, 10} in the existing LTE-A may be used identically. This may be understood as following the principles of the second or third embodiment.

In another example, referring to FIG. 12B, in the OFDM symbols {5, 6}, {9, 10} illustrated by 1202, and {12, 13}, CSI-RS mapping rules in the existing LTE-A are followed, and the same CSI-RS mapping rules as the OFDM symbols {9, 10} may be applied to the OFDM symbols {2, 3} illustrated by 1200. According to the example of FIG. 12B, a maximum of 8(=5+3) 8-port CSI-RS patterns may be defined in one PRB, and 64 CSI-RS REs per PRB may be used. Thus, by using CSI-RS aggregation, up to 32-port CSI-RS, a maximum of two reuse factors may be maintained for configuration.

Figure 13:
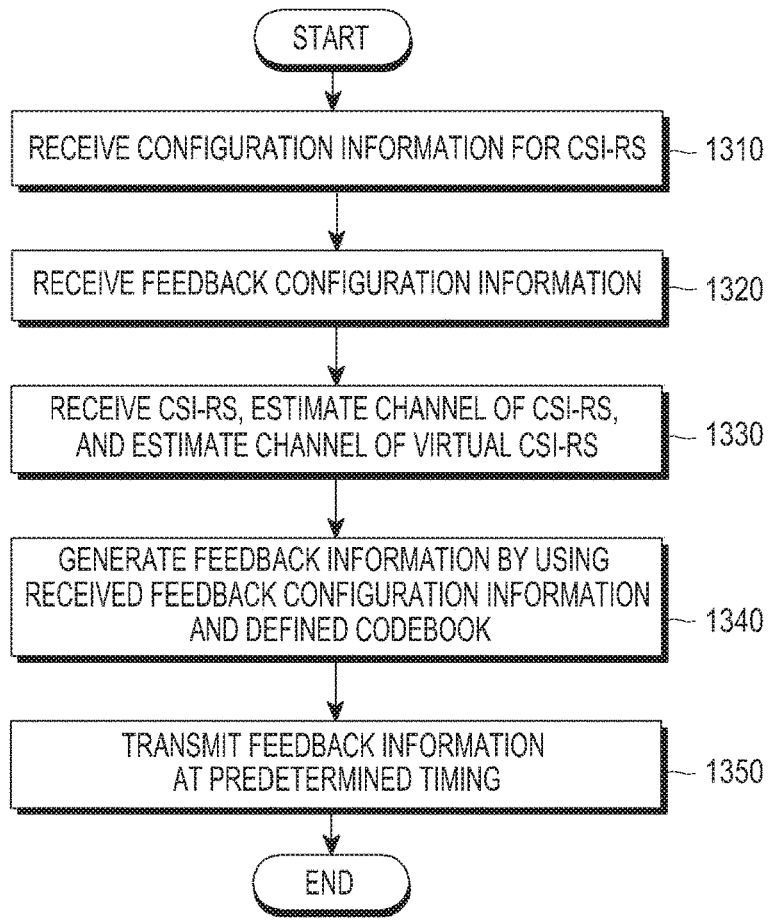
FIG. 13 is a flowchart of a method for controlling a UE according to an embodiment of the present disclosure.

FIG. 13 is a flowchart of a method for controlling a UE according to an embodiment of the present disclosure.

Referring to FIG. 13, the UE receives configuration information for a CSI-RS configuration in operation 1310. The configuration information may include CSI-RS configuration information according to at least any one of the foregoing embodiments. The UE may identify at least one of the number of ports for each CSI-RS, a timing and a resource position at which each CSI-RS is transmitted, and transmission power information, based on the received configuration information. The CSI-RS configuration information may include information indicating a frequency comb type in which the CSI-RS is transmitted. Selectively, if the CSI-RS configuration information is configured with a non-precoded CSI-RS, the CSI-RS configuration information may further include information for expressing a number of resources aggregated for transmission of the CSI-RS.

Selectively, the UE receives one feedback configuration information (e.g., feedback timing) based on at least one CSI-RS in operation 1320.

Selectively, upon receiving the CSI-RS, the UE estimates a channel between an eNB antenna and a UE reception antenna by using the received CSI-RS in operation 1330.

Selectively, in operation 1340, the UE generates feedback information, for example, rank, PMI, or CQI by using the received feedback configuration and the defined codebook based on the estimated channel. The estimated channel may include a virtual channel added based on the CSI-RS configuration information.

Thereafter, the UE reports a channel feedback by transmitting the feedback information (i.e., CSI) to the eNB at a certain feedback timing determined based on a feedback configuration of the eNB in operation 1350.

Figure 14:
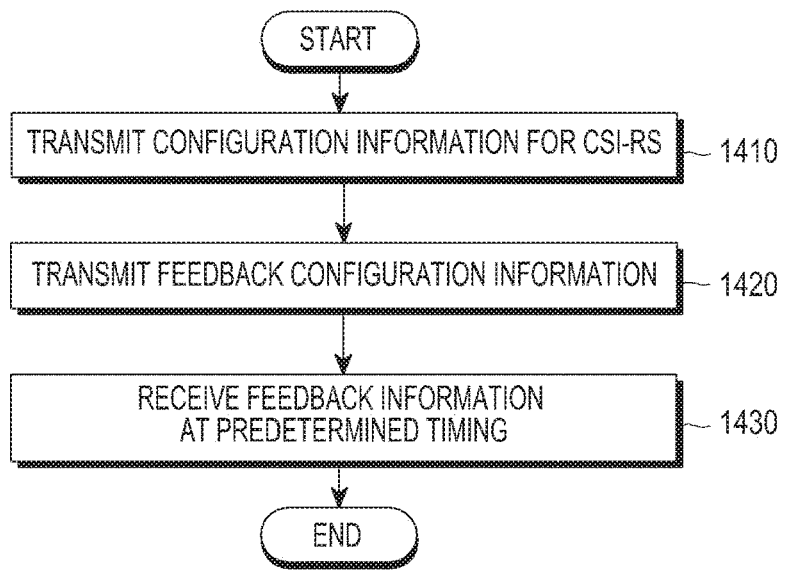
FIG. 14 is a flowchart of a method for controlling an eNB according to an embodiment of the present disclosure.

FIG. 14 is a flowchart of a method for controlling an eNB according to an embodiment of the present disclosure.

Referring to FIG. 14, the eNB determines a CSI-RS transmission configuration according to at least one of the foregoing embodiments of the present disclosure. The eNB then generates CSI-RS configuration information. The eNB transmits configuration information regarding a CSI-RS for channel measurement to the UE in operation 1410. The configuration information may include at least one of the number of ports for each CSI-RS, a timing and a resource position at which each CSI-RS is transmitted, and transmission power information, based on the received configuration information. The CSI-RS configuration information may include information indicating a frequency comb type in which the CSI-RS is transmitted. Selectively, if the CSI-RS configuration information is configured with a non-precoded CSI-RS, the CSI-RS configuration information may further include information for expressing a number of resources aggregated for transmission of the CSI-RS.

Thereafter, the eNB transmits feedback configuration information (e.g., feedback timing) based on at least one CSI-RS to the UE in operation 1420.

The eNB transmits the configured CSI-RS to the UE. The UE then estimates a channel for each antenna port by using the CSI-RS and estimates an additional channel for a virtual resource based on the estimated channel.

The eNB receives feedback information (e.g., PMI, RI, or CQI) from the UE at a determined timing in operation 1430 and uses the feedback information to determine a channel state between the UE and the eNB.

Figure 15:
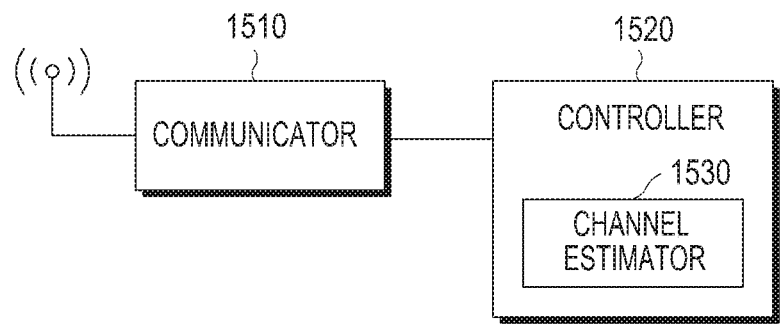
FIG. 15 is a block diagram of a structure of a UE according to an embodiment of the present disclosure.

FIG. 15 is a block diagram of a structure of a UE according to an embodiment of the present disclosure.

Referring to FIG. 15, the UE may include a communicator 1510 and a controller 1520. The communicator 1510 transmits or receives data to or from an external source (e.g., the BS). The communicator 1510 transmits feedback information to the BS under control of the controller 1520.

The controller 1520 controls state and operations of all elements of the UE.

More specifically, the controller 1520 generates the feedback information according to information allocated by the eNB. The controller 1520 controls the communicator 1510 to feed the generated channel information back to the BS according to timing information allocated by the eNB. To this end, the controller 1520 may include a channel estimator 1530.

The channel estimator 1530 determines necessary feedback information through CSI-RS configuration information and feedback configuration information received from the UE, and estimates a channel based on the CSI-RS configuration information or the feedback information by using the received CSI-RS.

Although it has been described in FIG. 15 that the UE includes the communicator 1510 and the controller 1520 as an example, the UE may further include various elements according to functions performed in the UE without being limited to the example. For example, the UE may further include a display unit for displaying a current state of the UE, an input unit through which a signal, such as function execution is input from the user, and a storage unit for storing generated data in the UE.

While the channel estimator 1530 is illustrated as being included in the controller 1520 in FIG. 15, the present disclosure is not limited to this illustration. The controller 1520 may control the communicator 1510 to receive configuration information regarding each of at least one reference signal resources from the eNB. The controller 1520 measures the at least one reference signals and controls the communicator 1510 to receive feedback configuration information for generating the feedback information based on the measurement result from the eNB.

The controller 1520 measures at least one reference signals received through the communicator 1510 and generates the feedback information according to the feedback configuration information. The controller 1520 controls the communicator 1510 to transmit the generated feedback information to the BS at a feedback timing based on the feedback configuration information. For example, the controller 1520 receives CSI-RS from the eNB, generates the feedback information based on the received CSI-RS, and transmits the generated feedback information to the eNB. The controller 1520 selects a precoding matrix by referring to a relationship between antenna port groups of the eNB. The controller 1520 receives additional feedback configuration information based on the feedback configuration information corresponding to each antenna port group of the eNB and the relationship between the antenna port groups.

Figure 16:
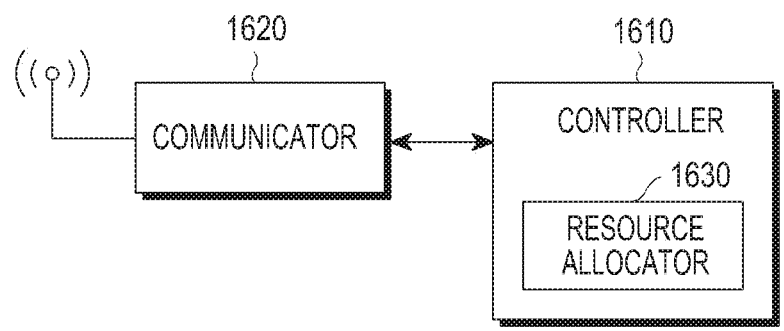
FIG. 16 is a block diagram of an eNB according to an embodiment of the present disclosure.

FIG. 16 is a block diagram of an eNB according to an embodiment of the present disclosure.

Referring to FIG. 16, the BS may include a controller 1610 and a communicator 1620.

The controller 1610 controls state and operations of all elements of the BS. More specifically, the controller 1610 allocates CSI-RS resources for channel estimation of the UE to the UE and allocates feedback resources and a feedback timing to the UE. To this end, the controller 1610 may further include a resource allocator 1630. To prevent feedbacks from several UEs from colliding with each other, feedback configuration and feedback timing are allocated, and configured feedback information is received and interpreted at a corresponding timing. While the resource allocator 1630 is illustrated as being included in the controller 1610, the present disclosure is not limited to this illustration.

The communicator 1620 transmits and receives data, a reference signal, and feedback information to and from the UE. Herein, the communicator 1620 transmits CSI-RS to the UE through an allocated resource and receives a feedback with respect to channel information from the UE, under control of the controller 1610.

The controller 1610 may control the communicator 1620 to transmit configuration information regarding each of at least one reference signal resources to the BS, or generate the at least one reference signals. The controller 1610 controls the communicator 1620 to transmit feedback configuration information for generating the feedback information based on the measurement result to the eNB.

The controller 1610 controls the communicator 1620 to transmit the at least one reference signal to the UE and to receive feedback information transmitted from the UE at a feedback timing corresponding to the feedback configuration information.

The controller 1610 transmits feedback configuration information from the UE, transmits CSI-RS from the UE, and receives feedback information based on the feedback configuration information and the CSI-RS from the UE. The controller 1610 may transmit additional feedback configuration information based on the feedback configuration information corresponding to each antenna port group of the BS and the relationship between the antenna port groups. The controller 1610 may transmit CSI-RS beamformed based on the feedback configuration information to the UE and receive feedback information generated based on the CSI-RS from the UE. The controller 1610 may transmit the non-precoded CSI-RS to the UE and receive feedback information generated based on the CSI-RS from the UE.

It should be noted that the antennas, the CSI-RS resource configuration, the method for controlling the UE, and the method for controlling the eNB, illustrated in FIGS. 4A, 4B, 5A, 5B, 5C, 6A, 6B, 7, 8A, 8B, 9A, 9B, 9C, 9D, 10A, 10B, 11A, 11B, 12A, 12B, 13, 14, 15, and 16 are not intended to limit the scope of the present disclosure. In other words, all of components or operations shown in FIGS. 4A, 4B, 5A, 5B, 5C, 6A, 6B, 7, 8A, 8B, 9A, 9B, 9C, 9D, 10A, 10B, 11A, 11B, 12A, 12B, 13, 14, 15, and 16 should not be construed to be essential components for implementation of the present disclosure, and even though only some data units, operations or components are included, the present disclosure may be implemented without departing from the scope and spirit of the disclosure.

According to the foregoing embodiments of the present disclosure, it is possible to prevent a BS having a large number of transmission antennas having a 2D antenna array structure from allocating excessive feedback resources for CSI-RS transmission and channel estimation complexity of the UE from increasing.

In addition, the UE may effectively measure all channels for a large number of transmission antennas, configure the measurement results as feedback information, and notify the eNB of the measurement results.

Using a method proposed in an embodiment of the present disclosure, the BS may configure CSI-RS ports for full/partial measurement according to its antenna elements structure. More particularly, according to an embodiment of the present disclosure, the BS expands the 12-/16-port CSI-RS configuration method defined in the LTE/LTE-A release 13 and configures various numbers of CSI-RS ports, such as {18, 20, 22, 24, 26, 28, 30, 32}-port in the terminal.

According to an embodiment of the present disclosure, the BS may configure CSI-RS of various structures in the terminal based on factors, such as a total number of ports to be configured, a 2D antenna arrangement form, a channel environment, and the like. The terminal generates channel information based on the configured CSI-RS ports and reports the BS of the generated channel information.

The above described operations may be implemented by providing a memory device storing a corresponding program code to an entity of a communication system, a function, or a specific structural element of the UE. For example, the entity, the function, the BS, or the controller of the UE carries out the above described operations by reading and executing the program code stored in the memory device by means of a processor or a central processing unit (CPU).

As described herein, various components or modules in the entity, function, eNB, or UE may be operated using a hardware circuit, e.g., a complementary metal oxide semiconductor-based logic circuit, firmware, software, and/or using a hardware circuit, such as a combination of hardware, firmware, and/or software embedded in a machine-readable medium. For example, various electric configurations and methods may be carried out by using electric circuits, such as transistors, logic gates, and an application specific integrated circuit (ASIC).

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for transmitting a channel state information reference signal (CSI-RS) by a base station using a plurality of CSI-RS ports in a wireless communication system, the method comprising:
    transmitting, to a user equipment (UE), at least one CSI-RS configuration information;
    transmitting, to the UE, at least one CSI-RS on at least one CSI-RS resource determined based on the at least one CSI-RS configuration information; and
    receiving, from the UE, channel state information (CSI) corresponding to the at least one CSI-RS,
    wherein the at least one CSI-RS configuration information comprises first information indicating a number of CSI-RS ports and second information on a CSI-RS density for the CSI-RS ports, the CSI-RS density indicating a density of the at least one CSI-RS resource in a frequency domain for the CSI-RS ports,
    wherein in case that the number of CSI-RS ports is a first value, both ½ density and 1 density are supported for the CSI-RS ports, wherein the first value includes 24 and 32 to support the ½ density and the 1 density,
    wherein in case that the number of CSI-RS ports is a second value, ½ density is not supported for the CSI-RS ports, and
    wherein the first value and the second value are different.

2. The method of claim 1, wherein the frequency domain comprises one of a resource element (RE), an antenna port, or a physical resource block (PRB).

3. The method of claim 1, wherein the second information on the CSI-RS density includes an indication for a resource block (RB) level comb offset indicating odd or even RBs occupied by the at least one CSI-RS.

4. The method of claim 1, wherein the second information on the CSI-RS density is used to configure one of a non-zero power CSI-RS resource or a zero power CSI-RS resource.

5. The method of claim 1, wherein the at least one CSI-RS is mapped to resource elements (REs) in a physical resource block (PRB) defined by time and frequency resources.

6. A method for receiving a channel state information reference signal (CSI-RS) by a user equipment (UE) using a plurality of CSI-RS ports in a wireless communication system, the method comprising:

receiving, from a base station, at least one CSI-RS configuration information;

receiving, from the base station, at least one CSI-RS on at least one CSI-RS resource determined based on the at least one CSI-RS configuration information; and transmitting, to the base station, channel state information (CSI) corresponding to the at least one CSI-RS, wherein the at least one CSI-RS configuration information comprises first information indicating a number of CSI-RS ports and second information on a CSI-RS density for the CSI-RS ports, the CSI-RS density indicating a density of the at least one CSI-RS resource in a frequency domain for the CSI-RS ports, wherein in case that the number of CSI-RS ports is a first value, both ½ density and 1 density are supported for the CSI-RS ports, wherein the first value includes 24 and 32 to support the ½ density and the 1 density, wherein in case that the number of CSI-RS ports is a second value, ½ density is not supported for the CSI-RS ports, and wherein the first value and the second value are different.

7. The method of claim 6, wherein the frequency domain comprises one of a resource element (RE), an antenna port, or a physical resource block (PRB).

8. The method of claim 6, wherein the second information on the CSI-RS density includes an indication for a resource block (RB) level comb offset indicating odd or even RBs occupied by the at least one CSI-RS.

9. The method of claim 6, wherein the second information on the CSI-RS density is used to configure one of a non-zero power CSI-RS resource or a zero power CSI-RS resource.

10. The method of claim 6, wherein the at least one CSI-RS is mapped to resource elements (REs) in a physical resource block (PRB) defined by time and frequency resources.

11. A base station for transmitting a channel state information reference signal (CSI-RS) in a wireless communication system, the base station comprising:

a communicator; and at least one processor configured to:
transmit, to a user equipment (UE), at least one CSI-RS configuration information,
transmit, to the UE, at least one CSI-RS on at least one CSI-RS resource determined based on the at least one CSI-RS configuration information, and
receive, from the UE, channel state information (CSI) corresponding to the at least one CSI-RS, wherein the at least one CSI-RS configuration information comprises first information indicating a number of CSI-RS ports and second information on a CSI-RS density for the CSI-RS ports, the CSI-RS density indicating a density of the at least one CSI-RS resource in a frequency domain for the CSI-RS ports, wherein in case that the number of CSI-RS ports is a first value, both ½ density and 1 density are supported for the CSI-RS ports, wherein the first value includes 24 and 32 to support the ½ density and the 1 density, wherein in case that the number of CSI-RS ports is a second value, ½ density is not supported for the CSI-RS ports, and wherein the first value and the second value are different.

12. The base station of claim 11, wherein the frequency domain comprises one of a resource element (RE), an antenna port, or a physical resource block (PRB).

13. The base station of claim 11, wherein the second information on the CSI-RS density includes an indication for a resource block (RB) level comb offset indicating odd or even RBs occupied by the at least one CSI-RS.

14. A user equipment (UE) for receiving a channel state information reference signal (CSI-RS) transmitted in a wireless communication system, the UE comprising:

a communicator; and at least one processor configured to:
receive, from a base station, at least one CSI-RS configuration information,
receive, from the base station, at least one CSI-RS on at least one CSI-RS resource determined based on the at least one CSI-RS configuration information, and
transmit, to the base station, channel state information (CSI) corresponding to the at least one CSI-RS, wherein the at least one CSI-RS configuration information comprises first information indicating a number of CSI-RS ports and second information on a CSI-RS density for the CSI-RS ports, the CSI-RS density indicating a density of the at least one CSI-RS resource in a frequency domain for the CSI-RS ports, wherein in case that the number of CSI-RS ports is a first value, both ½ density and 1 density are supported for the CSI-RS ports, wherein the first value includes 24 and 32 to support the ½ density and the 1 density, wherein in case that the number of CSI-RS ports is a second value, ½ density is not supported for the CSI-RS ports, and wherein the first value and the second value are different.

15. The UE of claim 14, wherein the frequency domain comprises one of a resource element (RE), an antenna port, or a physical resource block (PRB).

16. The UE of claim 14, wherein the second information on the CSI-RS density includes an indication for a resource block (RB) level comb offset indicating odd or even RBs occupied by the at least one CSI-RS.

* * * * *